United States Patent
Park et al.

(10) Patent No.: US 12,167,145 B2
(45) Date of Patent: Dec. 10, 2024

(54) PROCESSING CIRCUIT ANALYZING IMAGE DATA AND GENERATING FINAL IMAGE DATA

(71) Applicant: Samsung Electronics Co., Ltd., Suwon-si (KR)

(72) Inventors: Dong-Jin Park, Hwaseong-si (KR); Duck-Soo Kim, Seoul (KR); Dongki Min, Seoul (KR); Junam Song, Hwaseong-si (KR); Joonhyuk Im, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/187,299

(22) Filed: Mar. 21, 2023

(65) Prior Publication Data

US 2023/0232117 A1  Jul. 20, 2023

Related U.S. Application Data

(63) Continuation of application No. 17/479,104, filed on Sep. 20, 2021, now Pat. No. 11,616,916, which is a (Continued)

(30) Foreign Application Priority Data

Jan. 23, 2019 (KR) .................. 10-2019-0008892

(51) Int. Cl.
  *H04N 23/13* (2023.01)
  *H04N 23/76* (2023.01)
(52) U.S. Cl.
  CPC ............ *H04N 23/76* (2023.01); *H04N 23/13* (2023.01)

(58) Field of Classification Search
  CPC ........... H04N 23/13; H04N 23/67; G03B 3/04
  (Continued)

(56) References Cited

U.S. PATENT DOCUMENTS 8,446,492 B2  5/2013  Nakano et al.
9,154,697 B2  10/2015  Geiss et al.
(Continued)

FOREIGN PATENT DOCUMENTS

KR  2016-0137289 A  11/2016

OTHER PUBLICATIONS

Office Action dated Feb. 17, 2021, corresponding to U.S. Appl. No. 16/587,825.
(Continued)

*Primary Examiner* — Anthony J Daniels
(74) *Attorney, Agent, or Firm* — Harness, Dickey & Pierce, P.L.C.

(57) ABSTRACT

A processing circuitry is configured to generate a first analysis result based on a size of a partial area of a target area when the partial area is captured by only one of a first sensor or a second sensor, based on first image data for the target area captured by the first sensor and second image data for the target area captured by the second sensor, and generate first final image data or second final image data by using the first image data and the second image data, based on the first analysis result. A difference between the first final image data and the second final image data is based on a difference between a first characteristic of the first sensor and a second characteristic of the second sensor.

19 Claims, 16 Drawing Sheets

Related U.S. Application Data continuation of application No. 16/587,825, filed on Sep. 30, 2019, now Pat. No. 11,134,203.

(58) Field of Classification Search
USPC ........................................................ 348/345
See application file for complete search history.

(56) References Cited

U.S. PATENT DOCUMENTS

| | | |
|---|---|---|
| 9,264,610 B2 | 2/2016 | Duparre |
| 9,456,134 B2 | 9/2016 | Venkataraman et al. |
| 9,860,456 B1 | 1/2018 | Musatenko et al. |
| 10,003,738 B2 | 6/2018 | Lautenbach et al. |
| 10,331,024 B2 * | 6/2019 | Lablans ............... H04N 13/239 |
| 10,445,890 B2 | 10/2019 | Wang et al. |
| 2011/0242340 A1 * | 10/2011 | Miyawaki ............ H04N 23/687 |
| | | 348/E5.045 |
| 2012/0262607 A1 | 10/2012 | Shimura et al. |
| 2013/0229544 A1 | 9/2013 | Bando |
| 2015/0271471 A1 | 9/2015 | Hsieh et al. |
| 2016/0078598 A1 | 3/2016 | Tanabe |
| 2016/0182821 A1 | 6/2016 | Shabtay et al. |
| 2017/0366795 A1 | 12/2017 | Chou et al. |
| 2019/0007590 A1 | 1/2019 | Lee |
| 2019/0259139 A1 * | 8/2019 | Ichihashi ............... G06T 3/0093 |
| 2020/0112705 A1 | 4/2020 | Yokokawa et al. |
| 2020/0366843 A1 * | 11/2020 | Kobashiri ............... H04N 23/10 |

OTHER PUBLICATIONS

Notice of Allowance dated Jun. 1, 2021, corresponding to U.S. Appl. No. 16/587,825.

Office action dated Jun. 24, 2022 for corresponding U.S. Appl. No. 17/479,104.

Notice of Allowance dated Nov. 18, 2022 for corresponding U.S. Appl. No. 17/479,104.

* cited by examiner

PROCESSING CIRCUIT ANALYZING IMAGE DATA AND GENERATING FINAL IMAGE DATA

CROSS-REFERENCE TO RELATED APPLICATIONS

This application is a continuation of, and claims the benefit under 35 U.S.C. § 120 to, U.S. application Ser. No. 17/479,104, filed on Sep. 20, 2021, which claims priority under 35 U.S.C. § 120 to, U.S. application Ser. No. 16/587,825, filed on Sep. 30, 2019, which claims priority under 35 U.S.C. § 119 to Korean Patent Application No. 10-2019-0008892 filed on Jan. 23, 2019, in the Korean Intellectual Property Office, the disclosure of each of which is incorporated by reference herein in its entirety.

BACKGROUND

Some example embodiments described herein relate to devices that receive image data from a plurality of sensors.

Various types of electronic devices are being used. An electronic device, which includes an image sensor, from among electronic devices is used to capture a subject. For example, an electronic device that includes an image sensor may be implemented with one of various types of electronic devices such as a smartphone, a tablet personal computer (PC), a laptop PC, a wearable device, etc.

An electronic device may include one image sensor or a plurality of image sensors. As imaging technology has advanced, electronic devices including a plurality of image sensors have shown improvements over those including one image sensor. For example, electronic devices including the plurality of image sensors capture a wider area than electronic devices including one image sensor, thus displaying an image of higher definition.

However, when a plurality of image sensors are mounted in one electronic device, the plurality of image sensors are inevitably spaced from each other. This causes a difference between subjects captured by the different image sensors.

SUMMARY

Some example embodiments provide a processor that selects a way to generate final image data in consideration of an occlusion area.

According to some example embodiments, a processing circuitry is configured to generate a first analysis result based on a size of a partial area of a target area when the partial area is captured by only one of a first sensor or a second sensor, based on first image data for the target area captured by the first sensor and second image data for the target area captured by the second sensor, and generate first final image data or second final image data by using the first image data and the second image data, based on the first analysis result. A difference between the first final image data and the second final image data is based on a difference between a first characteristic of the first sensor and a second characteristic of the second sensor.

According to some example embodiments, a processor is configured to execute an instruction stored in a memory, wherein the instruction, when executed by the processor, causes the processor to generate a first analysis result based on a size of a partial area of a target area when the partial area is included in only one of first image data for the target area captured at a first position or second image data captured at a second position different from the first position. The processor is configured to generate first final image data by mapping a portion of the first image data onto the second image data or generate second final image data by mapping a portion of the second image data onto the first image data based on the first analysis result.

According to some example embodiments, a processing circuitry is configured to generate an analysis result based on first image data for a first area captured at a first position and second image data for a second area captured at a second position different from the first position, the second area including a portion of the first area. The processing circuitry is configured to generate first final image data by mapping first partial data of the first image data onto the second image data or generate second final image data mapping second partial data of the second image data onto the first image data, based on the analysis result.

BRIEF DESCRIPTION OF THE FIGURES

The above and other objects and/or features will become apparent by describing in detail some example embodiments with reference to the accompanying drawings.

DETAILED DESCRIPTION

Below, some example embodiments may be described in detail and clearly to such an extent that an ordinary one in the art easily implements the same.

Figure 1:
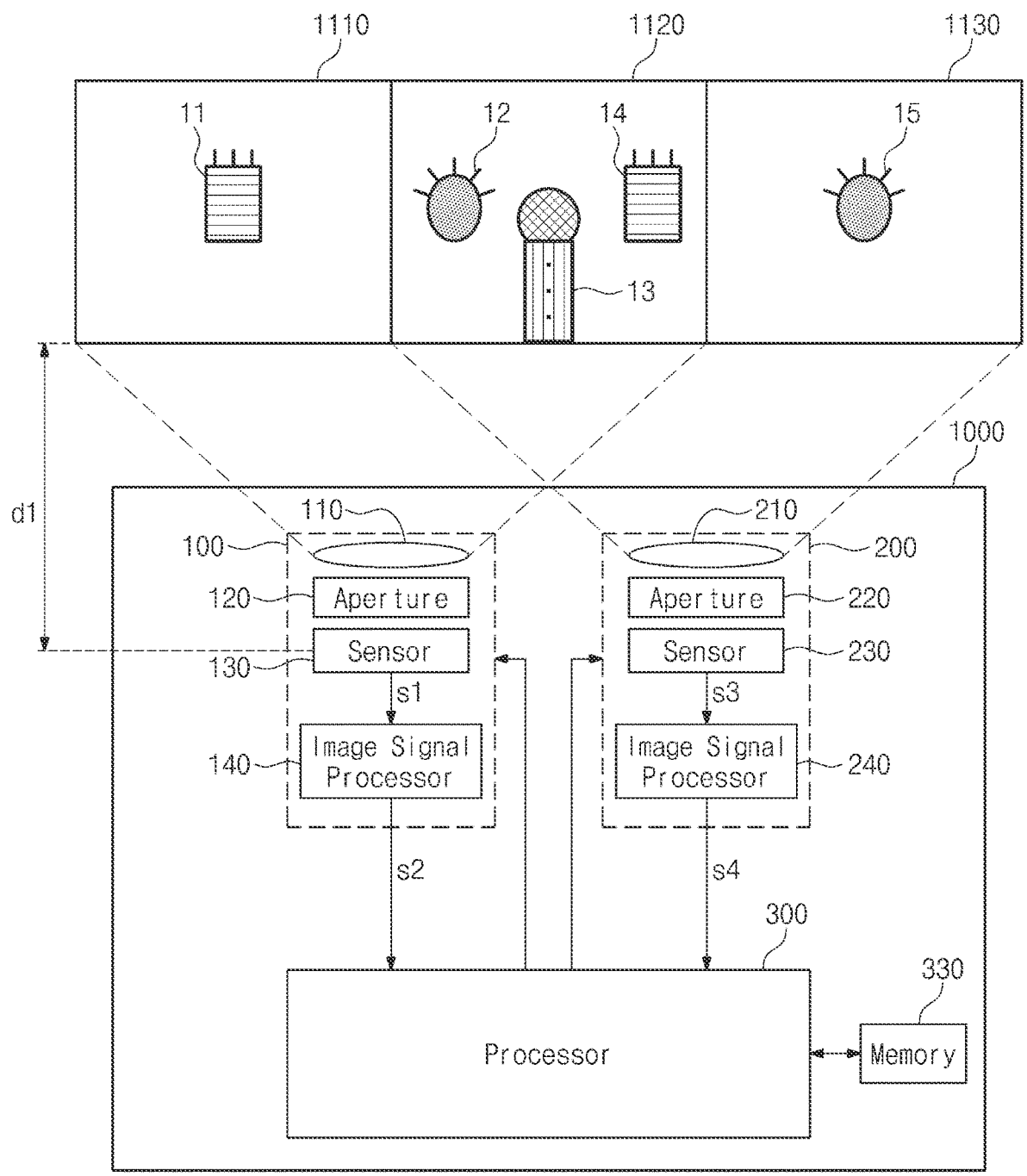
FIG. 1 is a block diagram illustrating an exemplary configuration of an electronic device including a processor according to some example embodiments.

FIG. 1 is a block diagram illustrating an exemplary configuration of an electronic device including a processor according to some example embodiments.

An electronic device 1000 may include image processing blocks 100 and 200 and a processor 300. The electronic device 1000 may capture areas 1110, 1120, and 1130 by using the image processing blocks 100 and 200. The electronic device 1000 may display an image associated with the areas 1110, 1120, and 1130 by using the image processing blocks 100 and 200 and the processor 300. Subjects 11, 12, 13, 14, and 15 present in the areas 1110, 1120, and 1130 may be displayed in the image. However, the image may display colors, brightness, etc. of the areas 1110, 1120, and 1130 as well as the subjects 11, 12, 13, 14, and 15. For example, the electronic device 1000 may be implemented with one of various types of electronic devices such as a smartphone, a tablet personal computer (PC), a laptop PC, an e-book reader, an MP3 player, a wearable device, etc.

The image processing block 100 may include a lens 110, an aperture 120, a sensor 130, and/or an image signal processor 140.

The lens 110 may receive a light reflected from the subjects 11, 12, 13, and 14 present in the areas 1110 and 1120.

The aperture 120 may adjust the amount of light passing through the lens 110. The brightness of the image associated with the areas 1110 and 1120 may vary with the amount of light passing through the lens 110.

The sensor 130 may be used to capture the areas 1110 and 1120 based on the light received through the lens 110. The sensor 130 may generate an image signal s1 associated with the areas 1110 and 1120 based on the light received through the lens 110. The image signal s1 may be an electrical signal.

The sensor 130 may include a color filter. For example, the color filter may be an RGB filter (e.g., representatively, having a Bayer pattern). The sensor 130 may receive only a light of a specific wavelength for each area (e.g., pixel) of the sensor 130 based on the color filter. For example, a light of a wavelength ranging from 580 nm to 670 nm may be received in an area, in which an "R" filter is included, from among areas of the sensor 130. The sensor 130 may be used to obtain information about a color of the areas 1110 and 1120 based on the light of the specific wavelength received through the color filter. That is, the sensor 130 may be provided for functions of obtaining information about luminance and/or a color of the areas 1110 and 1120.

The sensor 130 may generate the image signal s1 including information about elements of the areas 1110 and 1120 based on the light received through the color filter. For example, the image signal s1 may include information about the luminance of the areas 1110 and 1120 and/or information about the color of the areas 1110 and 1120.

The image signal processor 140 may process the image signal s1 to generate data for the elements of the areas 1110 and 1120. The image signal processor 140 may process the image signal s1 to generate data for the luminance of the areas 1110 and 1120 and/or data for the color of the areas 1110 and 1120. However, some example embodiments are not limited thereto. For example, the image signal processor 140 may process the image signal s1 to generate RGB data and/or to generate YCbCr data. The image signal processor 140 may output an image signal s2 including the data for the luminance of the areas 1110 and 1120 and/or the data for the color of the areas 1110 and 1120.

The image processing block 200 may include a lens 210, an aperture 220, a sensor 230, and/or an image signal processor 240.

The lens 210 may receive a light reflected from the subjects 12, 13, 14, and 15 present in the areas 1120 and 1130.

The aperture 220 may adjust the amount of light passing through the lens 210. The brightness of the image associated with the areas 1120 and 1130 may vary with the amount of light passing through the lens 210.

The sensor 230 may generate an image signal s3 based on the light received through the lens 210. The image signal s3 may be an electrical signal.

The sensor 230 may be used to obtain information about an element of the areas 1120 and 1130 based on the light received through the lens 210. That is, the sensor 230 may be provided for a function of obtaining information about luminance of the areas 1120 and 1130.

The sensor 230 may generate the image signal s3 including information about the element of the areas 1120 and 1130 based on the light received through the lens 210. The image signal s3 may include information about the luminance of the areas 1120 and 1130.

Characteristics of the sensor 130 and the sensor 230 may be complementary. For example, the sensor 130 and the sensor 230 may be implemented with sensors of different types. In this case, the sensor 130 and the sensor 230 may have different functions. The sensor 130 may be a sensor including a color filter, and/or the sensor 230 may be a high-sensitivity sensor.

For another example, the sensor 130 and the sensor 230 may be implemented with sensors of the same type or of similar types, but may have functions of different performance. According to some example embodiments, either or both of the sensor 130 and/or the sensor 230 may be implemented using one or more photodiodes and/or any other type of sensor capable of generating the image signals s1 and s3, as would be understood by a person having ordinary skill in the art. Both the sensor 130 and the sensor 230 may include a color filter, but sensitivity of the sensor 230 may be higher than sensitivity of the sensor 130. Also, both the sensor 130 and the sensor 230 may include a color filter, but the sensor 130 may have a wider field of view than the sensor 230. For example, the sensor 130 may capture the area 1110, 1120, 1130, while the sensor 230 may capture the area 1120, 1130. Complementary characteristics of the sensor 130 and the sensor 230 may be variously combined and used. In detail, the characteristics of the sensor 130 and the sensor 230 may be combined in a way to indicate the area captured by the sensor 130 more minutely (e.g., in greater detail). Also, the characteristics of the sensor 130 and the sensor 230 may be combined in a way to indicate the area captured by the sensor 230 more minutely. In the following descriptions, it is assumed that the sensor 130 is a sensor including a color filter and the sensor 230 is a high-sensitive sensor that does not include a color filter, but some example embodiments are not limited thereto.

The image signal s3 may not include information about a color of the areas 1120 and 1130. However, the sensor 230 may receive lights of all wavelengths without blocking a light of a specific wavelength. Accordingly, the amount of light that the sensor 230 receives may be greater than the amount of light that the sensor 130 receives at the same time or contemporaneously. In the case where the sensor 130 includes an RGB color filter, the amount of light that the sensor 230 receives may be three times greater than the amount of light that the sensor 130 receives at the same time or contemporaneously. Accordingly, with regard to the luminance of the area 1120, the image signal s3 may include more accurate information than the image signal s1.

The lens 210 and the sensor 230 may be spaced from the lens 110 and the sensor 130. That is, the lens 210 and the sensor 230 may be spaced from the lens 110 and the sensor 130 as much as a specific distance. As a result, the areas 1110 and 1120 captured through the sensor 130 may be different from the areas 1120 and 1130 captured through the sensor 230. The sensor 130 may capture the area 1110, but the sensor 230 may not capture the area 1110. The sensor 230 may capture the area 1130, but the sensor 230 may not capture the area 1110. According to some example embodiments, the area 1110 may include the area 1130.

The sensors 130 and 230 may capture the area 1120 in common. However, the sensor 130 may capture the area 1120 at a place where the sensor 130 is located, and the sensor 230 may capture the area 1120 at a place where the sensor 230 is located. As a result, pieces of information about the subjects 12, 13, and 14 included in the image signals s1 and s3 may be different from each other.

For example, the image signal s1 may include information about the subjects 12 and 13 and may not include information about the subject 14. Because the subject 14 is covered by the subject 13 when viewed from the place where the sensor 130 is located, the subject 14 may not be captured by the sensor 130.

For another example, the image signal s3 may include information about the subjects 13 and 14 and may not include information about the subject 12. Because the subject 12 is covered by the subject 13 when viewed from the place where the sensor 230 is located, the subject 12 may not be captured by the sensor 230.

The image signal processor 240 may process the image signal s3 to generate data for the element of the areas 1120 and 1130. For example, the image signal processor 240 may process the image signal s3 to generate data for the luminance of the areas 1120 and 1130. The image signal processor 240 may output an image signal s4 including the data for the luminance of the areas 1120 and 1130.

Unlike the image signal s2, the image signal s4 may not include data for a color. However, with regard to the luminance of the area 1120, the image signal s4 may include more accurate information than the image signal s2.

The processor 300 may perform various operations for controlling overall operations of the electronic device 1000. The processor 300 may control operations of the image processing block 100 and/or may process the image signals s2 and s4 received from the image processing block 100. According to some example embodiments, operations described herein as being performed by any or all of the image processing block 100, the image processing block 200, the image signal processor 140, the image signal processor 240, the processor 300 and/or the electronic device 1000 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the processor 300 may be implemented with a general-purpose processor, a special-purpose processor, or an application processor, and may include one or more processor cores. However, some example embodiments are not limited thereto. For example, the processor 300 and/or the image signal processors 140 and 240 may be included in one complementary metal-oxide semiconductor image sensor (CIS) chip. The processor 300 may be one image signal processor that receives the signals s2 and s4 to generate final image data. In this case, the processor 300 may output the final image data to a processor such as a general-purpose processor, a special-purpose processor, or an application processor.

A memory 330 may temporarily store data (e.g., data processed and/or to be processed by the processor 300) used for an operation of the electronic device 1000. For example, the memory 330 may include a volatile and/or nonvolatile memory such as a static random access memory (SRAM), a dynamic RAM (DRAM), a synchronous DRAM (SDRAM), a phase-change RAM (PRAM), a magneto-resistive RAM (MRAM), a resistive RAM (ReRAM), and/or a ferro-electric RAM (FRAM).

The processor 300 may control operations of the image processing block 100. For example, the processor 300 may control the operations of the image processing blocks 100 and 200 based on a control value that the user inputs through an input interface of the electronic device 1000. For another example, the processor 300 may analyze signals received from the image processing blocks 100 and 200 to control the operations of the image processing block 100.

The processor 300 may adjust a distance between the lenses 110 and 210 and the sensors 130 and 230. The processor 300 may adjust the distance between the lenses 110 and 210 and the sensors 130 and 230 such that the subject 13 captured in common by the sensors 130 and 230 is recognized by the sensors 130 and 230 as having the same size or similar sizes.

The processor 300 may analyze the signals received from the image processing blocks 100 and 200 to calculate a distance from the image processing blocks 100 and 200 to the areas 1110, 1120, and 1130. For example, the image processing blocks 100 and 200 may include one or more of a distance sensor, a photo diode, an infrared light receiving element, a charge coupled device, and/or a piezoelectric element. For example, the processor 300 may calculate the distance from the image processing blocks 100 and 200 to the areas 1110, 1120, and 1130 by using a triangulation manner and/or an ultrasonic manner.

The processor 300 may adjust a position of the sensors 130 and 230 and/or the lenses 110 and 210, based on the calculated distance. The processor 300 may adjust the position of the sensors 130 and 230 and/or the lenses 110 and 210 to adjust a focus between the lenses 110 and 210 and the sensors 130 and 230.

In the following descriptions, it is assumed that a distance from the image processing blocks 100 and 200 to the areas 1110, 1120, and 1130 calculated by the processor 300 is calculated on the basis of the sensors 130 and 230. That is, it is assumed that the distance from the image processing blocks 100 and 200 to the areas 1110, 1120, and 1130 is a distance d1 from the sensors 130 and 230 to the areas 1110, 1120, and 1130.

The processor 300 may output data for the calculated distance d1 to the memory 330. The memory 330 may store the data of the calculated distance d1 received from the processor 300.

The processor 300 may adjust openings of the apertures 120 and 220. The processor 300 may adjust a shutter speed. The processor 300 may control the amount of light incident to the sensors 130 and 230 by adjusting the openings of the apertures 120 and 220 and/or the shutter speed. The sensors 130 and 230 may sense brightness of the areas 1110, 1120, and 1130. The processor 300 may receive a signal associated with the sensed brightness from the image processing blocks 100 and 200. The processor 300 may adjust the openings of the apertures 120 and 220 and/or the shutter speed based on the sensed brightness.

The processor 300 may output data for a level of the sensed brightness to the memory 330. The memory 330 may store the data of the level of the sensed brightness received from the processor 300.

The processor 300 may process the image signals s2 and s4 received from the image processing blocks 100 and 200 to generate a final image signal. The final image signal may be used to display an image in an output interface (e.g., a display device) of the electronic device 1000. However, some example embodiments are not limited thereto. For example, the processor 300 may process three or more image signals to generate a final image signal. In this case, the processor 300 may generate the final image signal through operations that are the same or substantially the same as operations to be described below. According to some example embodiments, the electronic device 1000 may include a third image processing block having a third sensor and configured to generate third image data based on an image signal generated by the third sensor. The processor 300 may generates a final image signal based on image signals s2, s4 and the image signal generated by the third sensor. For example, the processor 300 may generate the final image signal based on a size of a region (e.g., an occlusion region) captured by only one or two of the first sensor, the second sensor or the third sensor.

The image signal s2 may include information about a color, luminance, etc. of the areas 1110 and 1120. Also, the image signal s2 may include information about an outline, a shape, a size, a color, etc. of the subjects 11, 12, and 13. The image signal s4 may include information about a color, luminance, etc. of the areas 1120 and 1130. Also, the image signal s4 may include information about an outline, a shape, a size, a color, etc. of the subjects 13, 14, and 15.

The processor 300 may analyze the image signals s2 and s4 to generate a final image signal in various methods. The processor 300 may generate a final image by using a fusion method. The fusion method refers to a method of selecting one of a color transfer (CT) manner and/or a detail transfer (DT) manner based on a result of analyzing the image signals s2 and/or s4 and generating a final image based on the selected manner Below, to select a transfer method means to select the color transfer method or the detail transfer method. However, some example embodiments are not limited thereto. For example, the processor 300 may generate final image data by using a first manner or a second manner, based on a result of analyzing the image signals s2 and s4. A difference between final image data generated in the first manner and final image data generated in the second manner may be based on a difference between characteristics of the sensors 130 and 230.

Also, data for the distance d1 from the image processing blocks 100 and 200 to the areas 1110, 1120, and 1130 may be stored in the memory 330. The processor 300 may select a transfer method by using data stored in the memory 330. That is, the processor 300 may select a transfer method for generating a final image by using the result of analyzing the image signals s2 and s4, the data for the distance d1, and/or the data for the level of the brightness.

An operation in which the processor 300 analyzes the image signals s2 and s4 to select a color transfer method or a detail transfer method will be more fully described with reference to FIGS. 2 to 16.

In the case where the color transfer method is selected, the processor 300 may generate a final image signal based on the image signal s4 and data for color included in the image signal s2. In this case, an output image that is displayed based on the final image signal may include the areas 1120 and 1130.

In the case where the detail transfer method is selected, the processor 300 may generate a final image signal based on the image signal s2 and data for luminance included in the image signal s4. In this case, an output image that is displayed based on the final image signal may include the areas 1110 and 1120. The color transfer method and the detail transfer method will be more fully described with reference to FIGS. 4 and 5.

Figure 2:
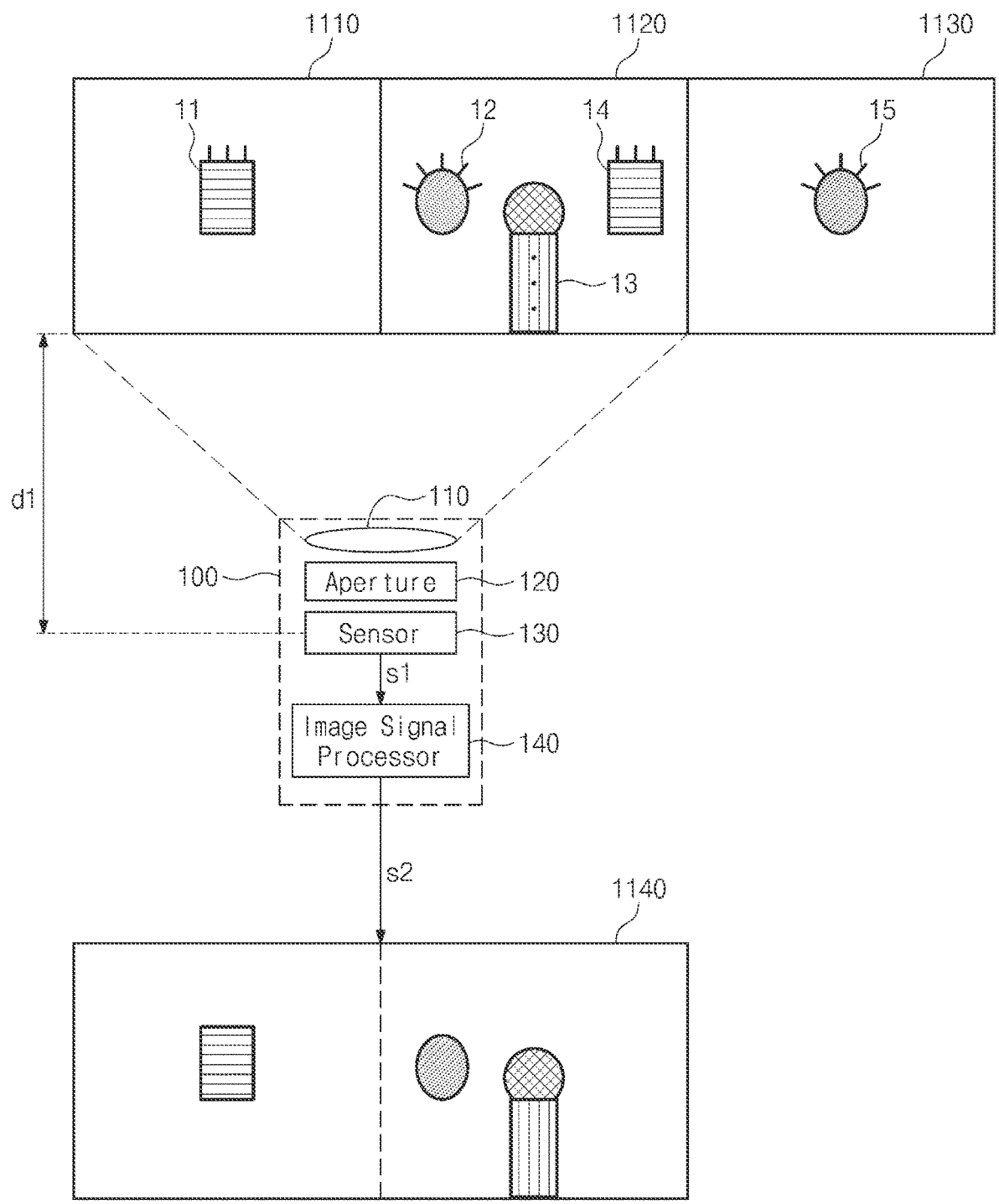
FIG. 2 is a conceptual diagram illustrating information included in an image signal output from an image processing block of FIG. 1.

FIG. 2 is a conceptual diagram illustrating information included in an image signal output from an image processing block of FIG. 1.

An image 1140 is an example of an image displayed based on the image signal s2 output from the image processing block 100. In the case where the area 1120 is captured at a place where the sensor 130 is located, because the subject 14 is covered by the subject 13, the subject 14 may not be captured by the sensor 130. Accordingly as described with reference to FIG. 1, the image signal s1 may not include information about the subject 14. Also, the image signal s2 may not include information about the subject 14. The image 1140 may not include the subject 14.

However, some example embodiments are not limited thereto. For example, a portion of a subject may cover another portion of the subject. Also, one subject may cover a plurality of subjects, and/or one subject may cover a portion of any other subject.

Below, an area that is covered by the subject 13 included in the image 1140 is referred to as an "occlusion area". The subject 14 may be in the occlusion area. As the distance d1 from the sensor 130 to the areas 1110 and 1120 decreases, the size of the occlusion area may become larger. As the distance d1 from the sensor 130 to the areas 1110 and 1120 increases, the size of the occlusion area may become smaller. FIGS. 1 to 8 are associated with the case where the distance d1 from the sensor 130 to the areas 1110 and 1120 is shorter, and the case where the distance d1 from the sensor 130 to the areas 1110 and 1120 is longer will be described with reference to FIGS. 9 to 13.

The image signal s2 may include data for colors and/or luminance of the areas 1110 and 1120. The image signal s2 may include data for colors and/or luminance of the subjects 11, 12, and 13 located in the areas 1110 and 1120.

Colors of the areas 1110 and 1120 may be displayed in the image 1140. Colors of the subjects 11, 12, and 13 may be displayed in the image 1140. Patterns displayed in the image 1140 may indicate colors of the subjects 11, 12, and 13, and different patterns may indicate different colors.

As described with reference to FIG. 1, due to a color filter, the amount of light that the sensor 130 receives may be smaller than the amount of light that the sensor 230 receives at the same time or contemporaneously. In detail, each pixel of the sensor 130 may receive a light corresponding to only one color (e.g., one of "R", "G", and/or "B") by a color filter (e.g., via a color filter). Accordingly, in the image signal processor 140, interpolation utilizing color data of an adjacent pixel may be used to generate data for luminance of the areas 1110 and 1120. As a result, a resolution of the image 1140 that is displayed based on the image signal s2 may be lower than a resolution of an image that is displayed based on the image signal s4.

Also, an ISO gain (e.g., an analog gain and/or a digital gain) of the sensor 130 may be set to be higher than an ISO gain of the sensor 230. Accordingly, the image signal processor 140 may generate data for luminance (indicating brightness) that is similar to data for luminance generated by the image signal processor 240. However, for this reason, noise included in the image 1140 that is displayed based on the image signal s2 may be greater than noise included in an image that is displayed based on the image signal s4, and thus, a signal-to-noise ratio (SNR) may decrease. Also, a resolution of the image signal s2 may be lower than a resolution of the image signal s4.

Accordingly, an outline, a surface, a pattern, etc. of the subjects 11, 12, and 13 may not be minutely represented (e.g., represented in greater detail) in the image 1140. For example, in the case where the subject 12 is a person, a nose, eyes, a mouth, etc. of the subject 12 may not be represented.

Figure 3:
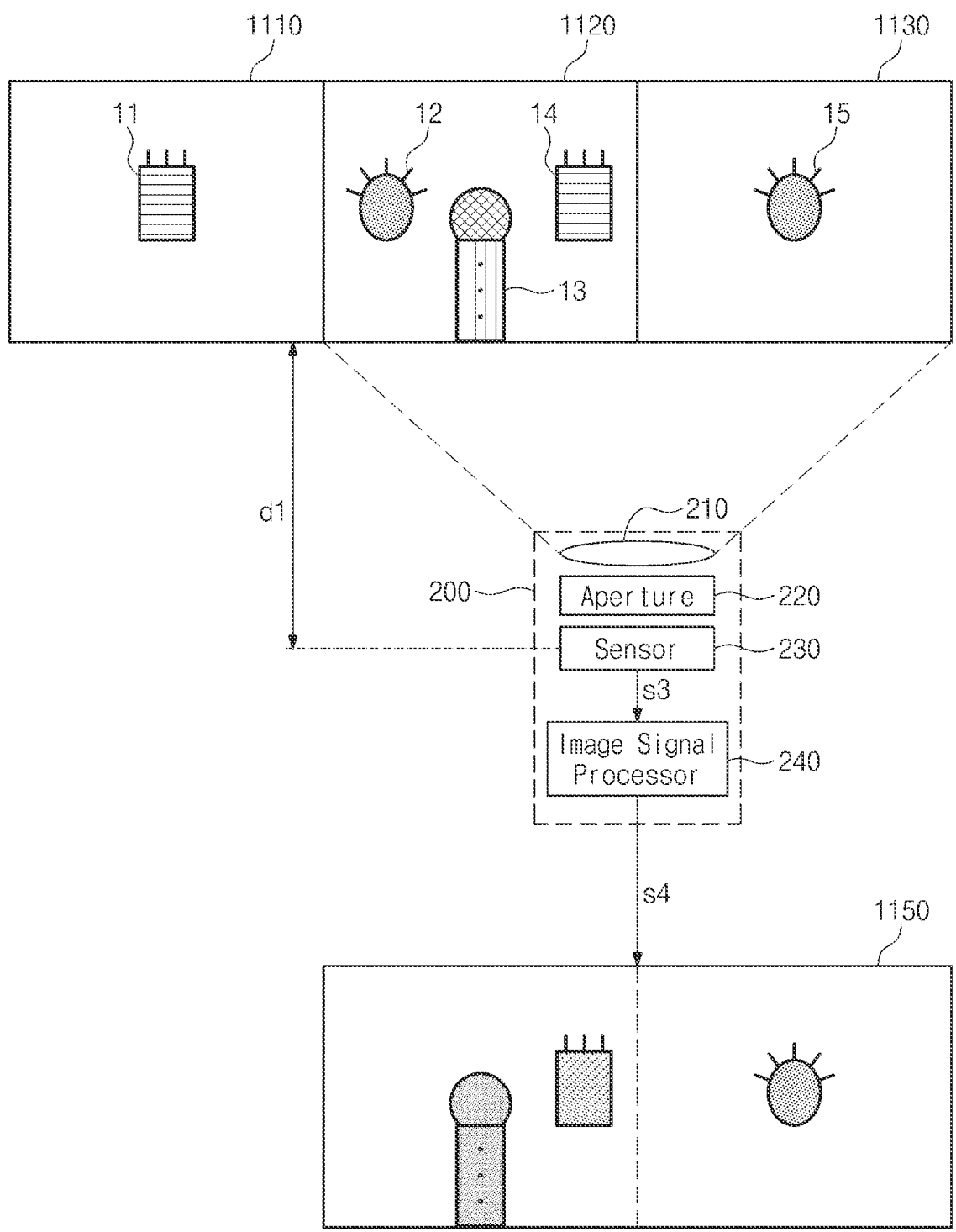
FIG. 3 is a conceptual diagram illustrating information included in an image signal output from an image processing block of FIG. 1.

FIG. 3 is a conceptual diagram illustrating information included in an image signal output from an image processing block of FIG. 1.

An image 1150 is an example of an image displayed based on the image signal s4 output from the image processing block 200. In the case where the area 1120 is captured at a place where the sensor 230 is located, because the subject 12 is covered by the subject 13, the subject 12 may not be captured by the sensor 230. Accordingly as described with reference to FIG. 1, the image signal s3 may not include information about the subject 12. Also, the image signal s4 may not include information about the subject 12. The image 1150 may not include the subject 12.

The image signal s4 may include data for luminance of the areas 1120 and 1130. The image signal s4 may include data for luminance of the subjects 13, 14, and 15 located in the areas 1120 and 1130.

As described with reference to FIG. 1, the amount of light that the sensor 230 receives may be greater than the amount of light that the sensor 130 receives at the same time or contemporaneously. In detail, each pixel of the sensor 230 may receive a light of the whole visible spectrum. Accordingly, the image signal processor 240 may not use separate interpolation for generating data for luminance of the areas 1120 and 1130. As a result, a resolution of the image 1150 that is displayed based on the image signal s4 may be higher than a resolution of the image 1140 that is displayed based on the image signal s2.

Also, because light sensitivity of the sensor 230 is higher than light sensitivity of the sensor 130, an ISO gain of the sensor 230 may be set to be lower than an ISO gain of the sensor 130. As a result, noise included in the image signal s4 may be smaller than noise included in the image signal s2. Also, for this reason, a resolution of the image 1150 that is displayed based on the image signal s4 may be higher than a resolution of the image 1140 that is displayed based on the image signal s2.

Accordingly, an outline, a surface, a pattern, etc. of the subjects 13, 14, and 15 may be minutely represented (e.g., represented in greater detail) in the image 1150. Referring to the image 1140 illustrated in FIG. 2, the subject 13 that is displayed in the image 1150 may be clearer than the subject 13 that is displayed in the image 1140.

However, as described with reference to FIG. 1, the image signal s4 may not include data for colors of the areas 1120 and 1130. Accordingly, the areas 1120 and 1130 included in the image 1150 may be displayed by a black color and/or a white color (e.g., a gray level). The subjects 13, 14, and 15 included in the image 1150 may be displayed by a black color and/or a white color (e.g., a gray level).

Figure 4:
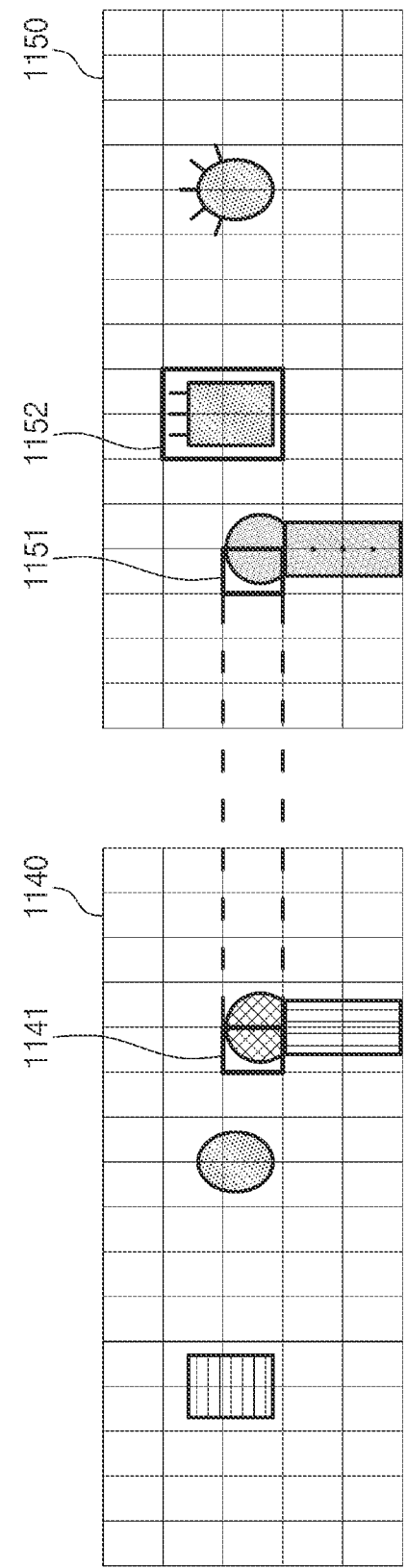
FIG. 4 is a conceptual diagram for describing an operation in which a processor of FIG. 1 selects a color transfer method or a detail transfer method.

FIG. 4 is a conceptual diagram for describing an operation in which a processor of FIG. 1 selects a color transfer method and/or a detail transfer method. For better understanding, FIGS. 1 and 4 will be referenced together.

The processor 300 may compare image blocks based on the image signal s2 and image blocks based on the image signal s4, by using the image signals s2 and s4. Each of the image blocks based on the image signal s2 may include information about one or more of pixels constituting the image 1140. Each of the image blocks based on the image signal s4 may include information about one or more of pixels constituting the image 1150. According to some example embodiments, the size and/or positioning of the image blocks of the image signals s2 and/or s4 may be design parameters determined through empirical study.

The processor 300 may compare the image blocks based on the image signal s2 and the image blocks based on the image signal s4 to detect image blocks 1152 corresponding to an occlusion area (also referred to as a region and/or a portion of an image herein). As described with reference to FIG. 2, the occlusion area may be an area that is covered by the subject 13 illustrated in FIG. 1 and thus is not displayed in the image 1140. In detail, the occlusion area may be an area that is displayed in the image 1150 but is not displayed in the image 1140 due to the subject 13. The image blocks 1152 indicating the occlusion area may not correspond to the image blocks based on the image signal s2. According to some example embodiments, the image blocks 1152 indicating the occlusion area may include blocks of which at least a threshold portion corresponds to the occlusion area. The threshold portion may be a design parameter determined through empirical study. The processor 300 may draw (e.g., determine) a size of the occlusion area from the number (e.g., quantity) of the detected image blocks 1152 and/or a size of the detected image blocks 1152. In the following descriptions, the size of the image blocks 1152 may correspond to the number (e.g., quantity) of pixels that the image blocks 1152 include. Accordingly, the larger the size of the image blocks 1152 the greater the number of pixels that the image blocks 1152 includes. Also, the size of the occlusion area may be expressed by the number of pixels included in the occlusion area.

However, some example embodiments are not limited thereto. For example, the occlusion area may include an area that is covered by the subject 13 and thus is not displayed in the image 1150 and/or an area that is not displayed in the image due to the subject 13. The occlusion area may be an area, which is relatively large, from among the area that is covered by the subject 13 and thus is not displayed in the image 1150 and the area that is not displayed in the image due to a subject (e.g., image block 1141).

The processor 300 may draw the size of the occlusion area by using an optical flow technique, a stereo matching technique, etc., but some example embodiments are not limited thereto. In the case of using the optical flow technique, the processor 300 may draw the size of the occlusion area based on a magnitude of a change in a motion vector. For example, as the occlusion area increases, the change in the motion vector may increase.

In the case of using the stereo matching technique, the processor 300 may generate a depth map and may draw the size of the occlusion area based on a change in a depth. For example, a large occlusion area may be detected based on an area where a depth sharply changes.

The processor 300 may select a transfer method based on a size of the detected occlusion area and/or the distance d1 from the sensors 130 and/or 230 to the areas 1110, 1120, and/or 1130.

The processor 300 may select a transfer method based on a result of comparing the distance d1 and a reference distance.

The processor 300 may select a transfer method based on a result of comparing the size of the detected occlusion area and a reference size. The processor 300 may select a transfer method based on a result of comparing the number of pixels included in the detected occlusion area and a reference count.

The processor 300 may select a transfer method based on a result of comparing the number of image blocks (or the number of pixels) included in the image blocks 1152 and the reference count. An operation of comparing the number of image blocks and the reference count may be the same as or substantially the same as an operation of comparing the size of the detected occlusion area and the reference size. Accordingly, in the following descriptions, the operation of comparing the size of the detected occlusion area and the reference size may be replaced with the operation of comparing the number of image blocks and the reference count.

The processor 300 may select a transfer method by considering the size of the detected occlusion area and the distance d1 in various manners.

For example, when the distance d1 is smaller than the reference distance, the processor 300 may select the detail transfer method. When the distance d1 is greater than the reference distance, the processor 300 may select the color transfer method or the detail transfer method based on the size of the occlusion area. In this case, when the size of the detected occlusion area is greater than the reference size, the processor 300 may select the detail transfer method. When the size of the detected occlusion area is smaller than the reference size, the processor 300 may select the color transfer method.

For another example, the processor 300 may select the color transfer method and/or the detail transfer method by converting the distance d1 and the size of the detected occlusion area and comparing the generated conversion value and a reference value. According to some example embodiments, any or all of the reference distance, the reference size, the reference count, and/or the reference value may be design parameters determined through empirical study.

The processor 300 may select a transfer method in various methods. However, as a result, the processor 300 may select the detail transfer method when the size of the detected occlusion area is great and may select the color transfer method when the size of the detected occlusion area is small.

The processor 300 may select a transfer method in consideration of both the size of the detected occlusion area and the distance d1, thus reducing the amount of data to be processed and improving reliability of a transfer method selected by the processor 300.

The processor 300 may compare the image blocks based on the image signal s2 and the image blocks based on the image signal s4 to detect the image block 1141 corresponding to an image block 1151. The image block 1141 may include information that corresponds to or is similar to information that the image block 1151 includes. For example, the image blocks 1141 and 1151 may include information about luminance of a portion of the subject 13.

For another example, the image block 1141 may include information about a color of a portion of the subject 13.

In the case of selecting the color transfer method, the processor 300 may map data for color included in the image signal s2 onto the image signal s4. The processor 300 may map the data for color included in the image block 1141 onto the image block 1151 corresponding to the image block 1141. In the case where the data for color included in the image block 1141 is mapped onto the image block 1151, data corresponding to the image block 1151 may include the data for color included in the image block 1141. Accordingly, a color may be displayed in an image that is based on the data corresponding to the image block 1151.

However, because the image blocks 1152 do not correspond to image blocks based on the image signal s2, data for color included in the image signal s2 may not be mapped onto the image blocks 1152.

In the case of selecting the detail transfer method, the processor 300 may map data for luminance included in the image signal s4 onto the image signal s2. The processor 300 may map the data for luminance included in the image block 1151 onto the image block 1141 corresponding to the image block 1151.

For example, in the case where the data for luminance included in the image block 1151 is mapped onto the image block 1141, data for luminance included in the image block 1141 may be replaced with the data for luminance included in the image block 1151. In this case, the processor 300 may generate a final image signal by using the data for luminance included in the image block 1151 and the data for color included in the image block 1141.

For another example, in the case where the data for luminance included in the image block 1151 is mapped onto the image block 1141, data for luminance included in the image block 1141 may include (e.g., may be added to, combined with, etc.) the data for luminance included in the image block 1151. In this case, the processor 300 may generate a final image signal by using the data for luminance included in the image block 1151, the data for luminance included in the image block 1141, and the data for color included in the image block 1141.

Figure 5:
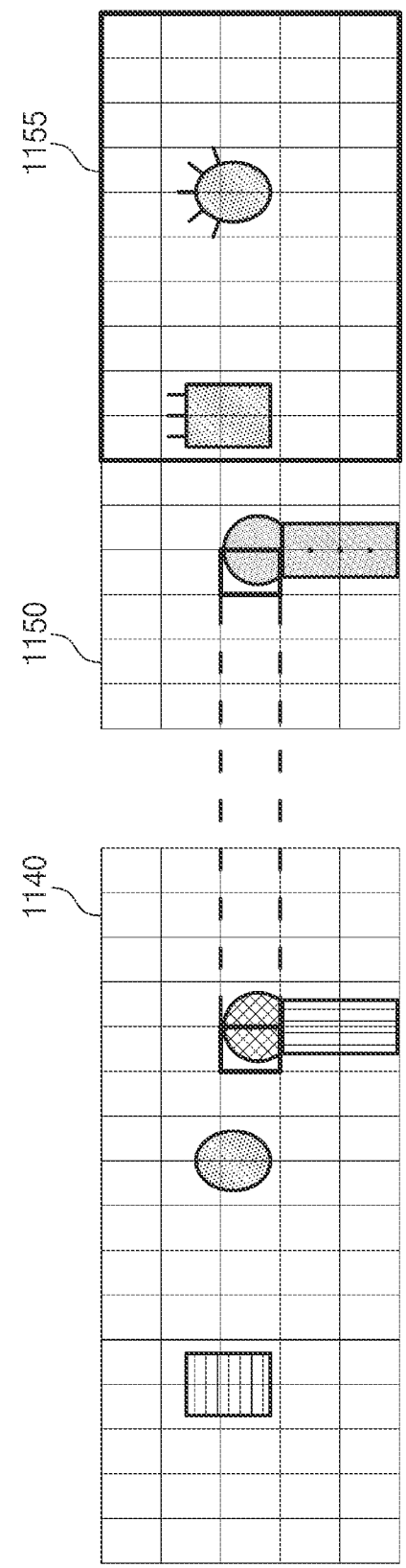
FIG. 5 is a conceptual diagram for describing an exemplary operation in which a processor of FIG. 1 selects a color transfer method or a detail transfer method.

FIG. 5 is a conceptual diagram for describing an exemplary operation in which a processor of FIG. 1 selects a color transfer method and/or a detail transfer method. For better understanding, FIGS. 1 and 5 will be referenced together.

The processor 300 may select the color transfer method and/or the detail transfer method based on a size of an area 1155 (also referred to as a region and/or a portion of an image herein) not displayed in both the image 1140 and the image 1150 (e.g., displayed in image 1150 and not in image 1140, and/or displayed in image 1140 and not in image 1150) and/or the distance d1 from the sensors 130 and/or 230 to the areas 1110, 1120, and/or 1130.

As in the way described with reference to FIG. 4, the processor 300 may detect the area 1155. However, a method in which the processor 300 selects a transfer method based on a size of an occlusion area is described with reference to FIG. 4, and a method in which the processor 300 selects a transfer method based on a size of the area 1155 will be described with reference to FIG. 5.

The size of the area 1155 may be determined based on the size of the occlusion area and a size of the areas 1110 and/or 1130. That is, the size of the area 1155 may correspond to a sum of the size of the area 1110 or the area 1130 and the size of the occlusion area.

The size of the areas 1110 and 1130 may vary with a distance between the sensors 130 and 230 and the distance d1 from the sensors 130 and 230 to the areas 1110, 1120, and 1130. Because the distance between the sensors 130 and 230 is fixed, the size of the areas 1110 and 1130 may vary with the distance d1. As the distance d1 decreases, the size of the areas 1110 and 1130 may increase compared with the size of the area 1120.

The processor 300 may select the color transfer method and/or the detail transfer method based on the size of the area 1155 and the distance d1 from the sensors 130 and 230 to the areas 1110, 1120, and 1130. As described with reference to FIG. 4, the processor 300 may select a transfer method by considering the size of the area 1155 and the distance d1 in various manners.

For example, when the distance d1 is smaller than the reference distance, the processor 300 may select the detail transfer method. When the distance d1 is greater than the reference distance, the processor 300 may select the color transfer method or the detail transfer method based on the size of the area 1155. In detail, when the size of the area 1155 is greater than the reference size, the processor 300 may select the detail transfer method. In detail, when the size of the area 1155 is smaller than the reference size, the processor 300 may select the color transfer method.

For another example, the processor 300 may select the color transfer method and/or the detail transfer method by converting the distance d1 and the size of the area 1155 and comparing the generated conversion value and a reference value.

The processor 300 may select a transfer method in various methods. However, as a result, the processor 300 may select the detail transfer method when the size of the area 1155 is great and may select the color transfer method when the size of the area 1155 is small.

Figure 6:
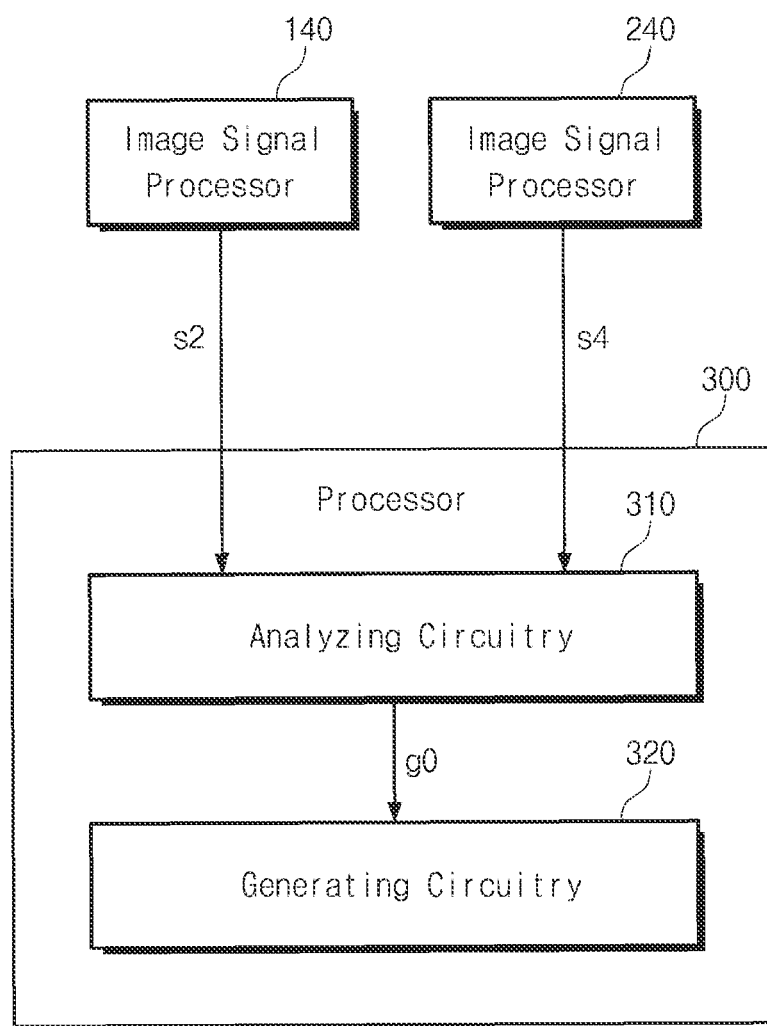
FIG. 6 is a block diagram illustrating an exemplary configuration of a processor of FIG. 1.

FIG. 6 is a block diagram illustrating an exemplary configuration of a processor of FIG. 1.

The processor 300 may include an analyzing circuitry 310 and a generating circuitry 320. Each of the analyzing circuitry 310 and the generating circuitry 320 may perform some of operations that the processor 300 provides. According to some example embodiments, operations described herein as being performed by either or both of the analyzing circuitry 310 and/or the generating circuitry 320 may be performed by processing circuitry.

In detail, the analyzing circuitry 310 may receive the image signals s2 and s4. By using the image signals s2 and s4, the analyzing circuitry 310 may perform an operation of drawing (e.g., determining) a size of an occlusion area and/or an operation of drawing (e.g., determining) the distance d1 from the sensors 130 and 230 to the areas 1110, 1120, and 1130. Also, the analyzing circuitry 310 may perform an operation of comparing the size of the occlusion area and a reference size and/or an operation of comparing the distance d1 and a reference distance. The analyzing circuitry 310 may output a signal g0 based on a result of the comparison.

The generating circuitry 320 may receive the signal g0. The signal g0 may indicate a result of comparing the size of the occlusion area and the reference size and/or a result of comparing the distance d1 and the reference distance. The generating circuitry 320 may select the color transfer method or the detail transfer method based on the signal g0. The generating circuitry 320 may generate a final image signal by using the selected transfer method. The analyzing circuitry 310 and the generating circuitry 320 are exemplified to describe configurations and operations of the processor 300, but some example embodiments are not limited thereto.

Figure 7:
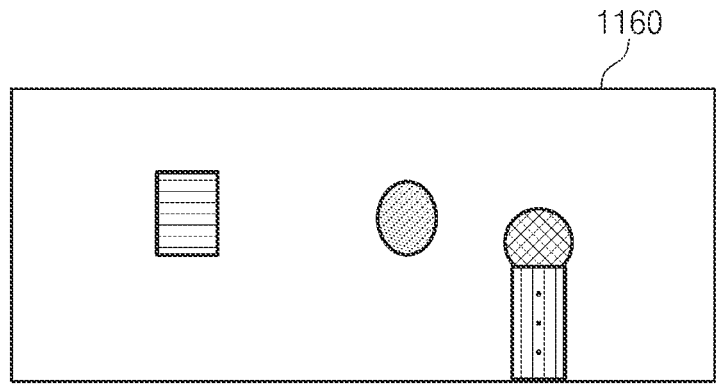
FIG. 7 is a conceptual diagram for describing a final image generated by using a detail transfer method.
Figure 8:
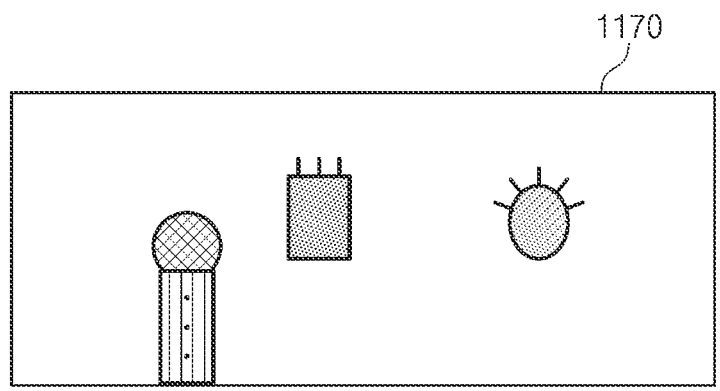
FIG. 8 is a conceptual diagram for describing a final image generated by using a color transfer method.

FIG. 7 is a conceptual diagram for describing a final image generated by using a detail transfer method. FIG. 8 is a conceptual diagram for describing a final image generated by using a color transfer method. For better understanding, FIGS. 7 and 8 will be referenced together.

An image 1160 is an example of an image displayed based on a final image signal that is generated by using the detail transfer method. As described with reference to FIG. 4, in the case where the image signal s2 does not include data corresponding to the area 1130 that data included in the image signal s4 includes, the image 1160 may not display the area 1130. Accordingly, the image 1160 that is generated by using the detail transfer method may be associated with the areas 1110 and 1120. Also, the subject 13 included in the image 1160 may be biased to the right.

As described with reference to FIG. 1, noise included in the image signal s4 may be smaller than noise included in the image signal s2. Accordingly, a resolution of the image 1160 may be higher than a resolution of the image 1140 illustrated in FIG. 2. Also, an output image signal may include less noise than the image signal s2. That is, the image 1160 may be clearer than the image 1140. Also, the subject 13 included in the image 1160 may be more minute (e.g., detailed) than the subject 13 included in the image 1140.

An image 1170 is an example of an image displayed based on a final image signal that is generated by using the color transfer method. As described with reference to FIG. 4, in the case where the image signal s4 does not include data corresponding to the area 1110 that data included in the image signal s2 includes, the image 1170 may not include the area 1110. Accordingly, the image 1170 that is generated by using the color transfer method may be associated with the areas 1120 and 1130. Also, the subject 13 included in the image 1170 may be biased to the left.

Accordingly, the user may determine whether a final image is generated in any transfer method of the detail transfer method and/or the color transfer method, through areas included in a final image and/or a position of a subject included in the final image.

As described with reference to FIG. 1, a color of the image 1170 may be displayed based on data for a color included in the image signal s2. However, because the image signal s2 does not include color data associated with subjects 14 and 15, the subjects 14 and 15 of the image 1170 may be displayed by a black color and/or a white color. As an occlusion area or the area 1155 illustrated in FIG. 5 becomes greater, the appearance of color loss phenomenon and/or artifacts may increase. Also, colors of the subjects 14 and 15 included in the image 1170 may be different from actual colors. As an occlusion area or the area 1155 illustrated in FIG. 5 becomes greater, the appearance of this pseudo loss phenomenon may appear increase.

Accordingly, in the case where an occlusion area is great, the processor 300 may generate a final image signal by using the detail transfer method, thus preventing or reducing the color loss phenomenon, the artifacts, and/or the pseudo loss phenomenon. Also, the processor 300 may generate the final image signal based on the image signal s2 and data for luminance included in the image signal s4, thus improving the quality of the final image.

Figure 9:
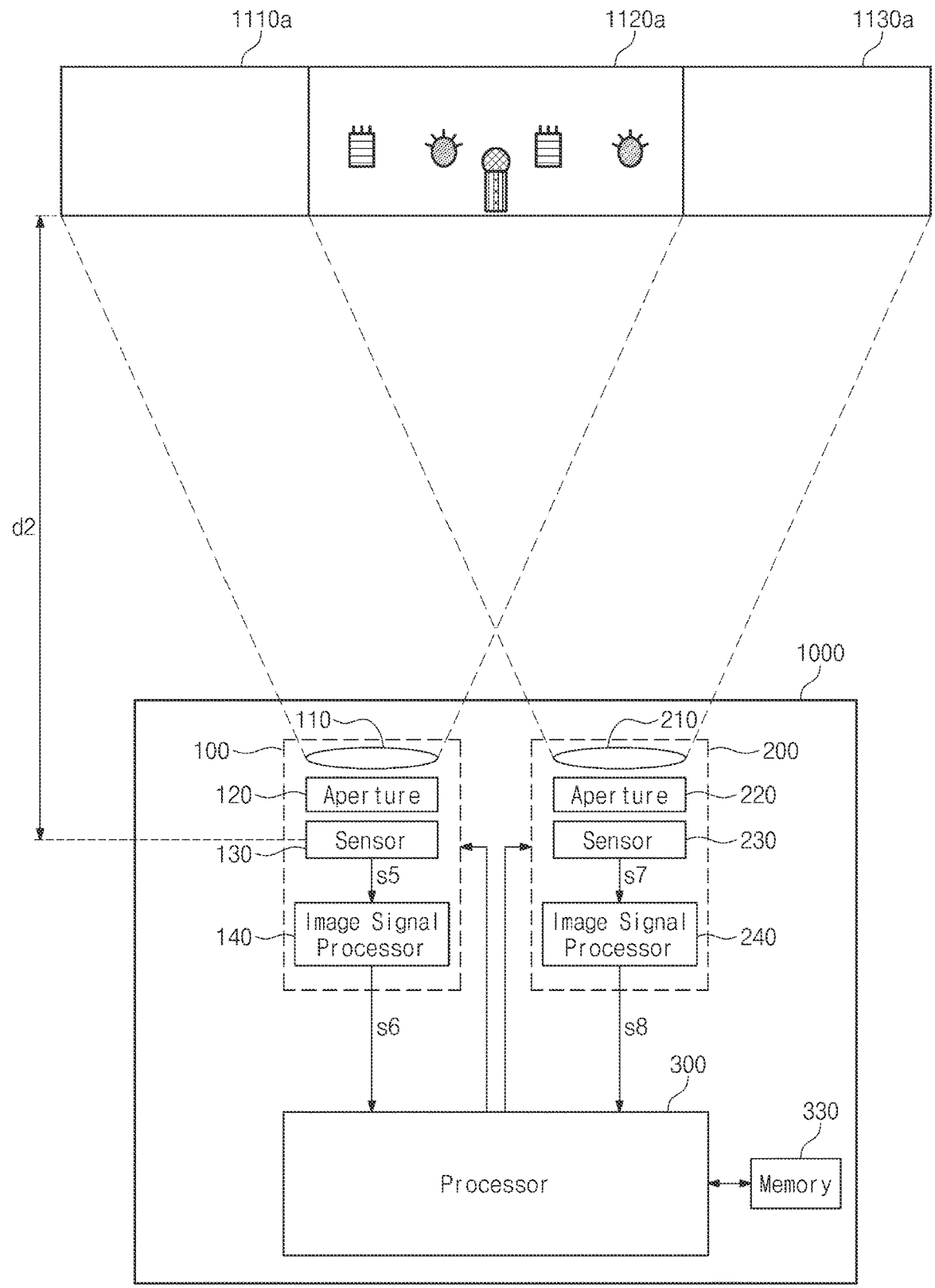
FIG. 9 is a block diagram illustrating an exemplary configuration of an electronic device including a processor according to some example embodiments.

FIG. 9 is a block diagram illustrating an exemplary configuration of an electronic device including a processor according to some example embodiments. For better understanding, FIGS. 1 and 9 will be referenced together.

FIG. 9 shows the case where the electronic device 1000 is located further from the areas 1110, 1120, and 1130 of FIG. 1 than the electronic device 1000 illustrated in FIG. 1. In the following descriptions, it is assumed that a distance d2 from the sensors 130 and/or 230 to the areas 1110, 1120, and/or 1130 is greater than the distance d1 illustrated in FIG. 1.

As the distance d2 from the sensors 130 and 230 to the areas 1110, 1120, and 1130 increases, a size of an area 1120a, which is captured in common by the sensors 130 and 230, may increase. All the subjects 11, 12, 13, 14, and 15 may be in the area 1120a captured in common by the sensors 130 and 230. An area 1110a that is captured only by the sensor 130 and an area 1130a that is captured only by the sensor 230 may decrease in size.

In this case, as a result, an occlusion area or the area 1155 illustrated in FIG. 5 may decrease, and the processor 300 may output a final image signal by using the color transfer method.

As described with reference to FIG. 1, an image signal s5 may include data for colors and/or luminance of the areas 1110a and 1120a. The image signal processor 140 may generate data for the luminance of the areas 1110a and 1120a and/or data for the color of the areas 1110a and 1120a, based on the image signal s5. An image signal s6 may include data for the luminance of the areas 1110a and 1120a and/or data for the color of the areas 1110a and 1120a.

The image signal s7 may include data for colors and/or luminance of the areas 1120a and 1130a. The image signal processor 140 may generate data for the luminance of the areas 1120a and 1130a, based on the image signal s7. An image signal s8 may include data for luminance of the areas 1120a and 1130a. With regard to the luminance of the area 1120a, the image signal s8 may include more accurate information than the image signal s6.

Figure 10:
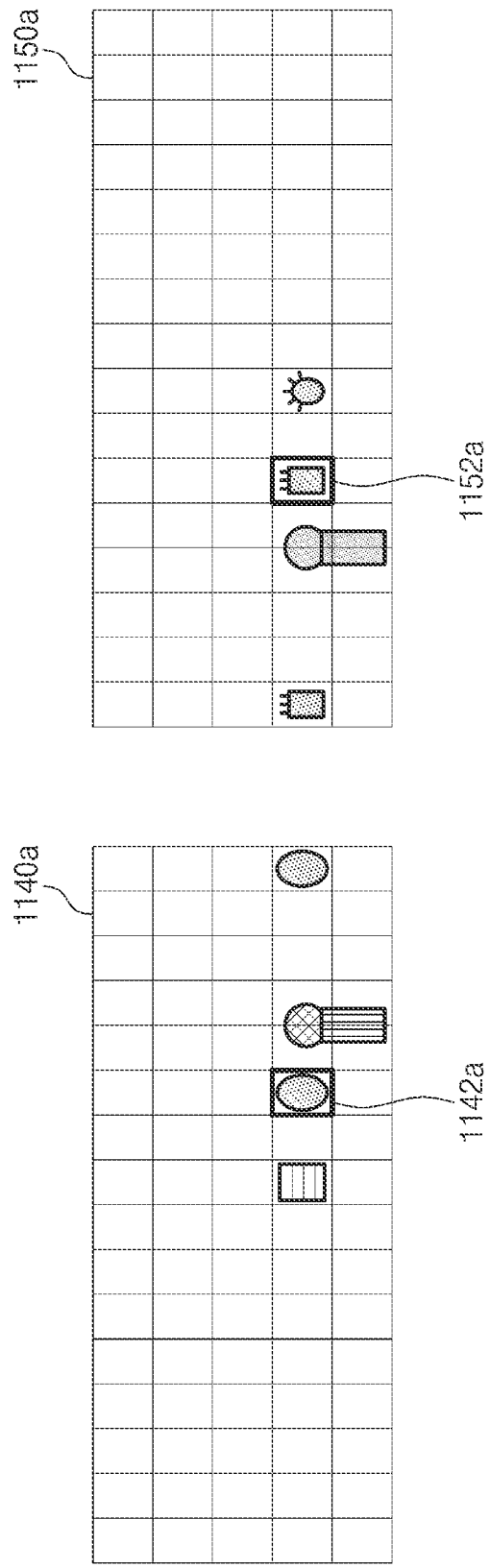
FIG. 10 is a conceptual diagram for describing an exemplary operation in which a processor of FIG. 9 selects a color transfer method or a detail transfer method.

FIG. 10 is a conceptual diagram for describing an exemplary operation in which a processor of FIG. 9 selects a color transfer method and/or a detail transfer method.

An image 1140a is an example of an image displayed based on the image signal s6 output from an image processing block 110. An image 1150a is an example of an image displayed based on the image signal s8 output from an image processing block 200.

As described with reference to FIG. 4, the processor 300 may compare image blocks based on the image signal s6 and image blocks based on the image signal s8 to detect an image block(s) 1152a corresponding to an occlusion area.

As described with reference to FIG. 4, the processor 300 may draw (e.g., determine) a size of the occlusion area from the number of the detected image block(s) 1152a and/or a size of the detected image block(s) 1152a. In the case a distance of the sensors 130 and/or 230 from the areas 1110a, 1120a, and/or 1130a increases, the size of the occlusion area may decrease. For example, the image blocks 1152 illustrated in FIG. 4 include four image blocks; in contrast, the image block 1152a may include one image block.

That the size of the occlusion area varies with a distance from the areas 1110, 1120, and/or 1130 to the sensors 130 and/or 230 may be understood from a result of comparing FIG. 4 and FIG. 10. In detail, as the distance from the areas 1110, 1120, and/or 1130 to the sensors 130 and/or 230 decreases, the size of the occlusion area may increase. As the distance from the areas 1110, 1120, and/or 1130 to the sensors 130 and/or 230 increases, the size of the occlusion area may decrease, or the occlusion area may disappear.

However, as described with reference to FIG. 4, the occlusion area may be variously exemplified. That is, an image block including an occlusion area may mean an image block 1142a, an image block 1152a, and/or the image blocks 1142a and/or 1152a.

Figure 11:
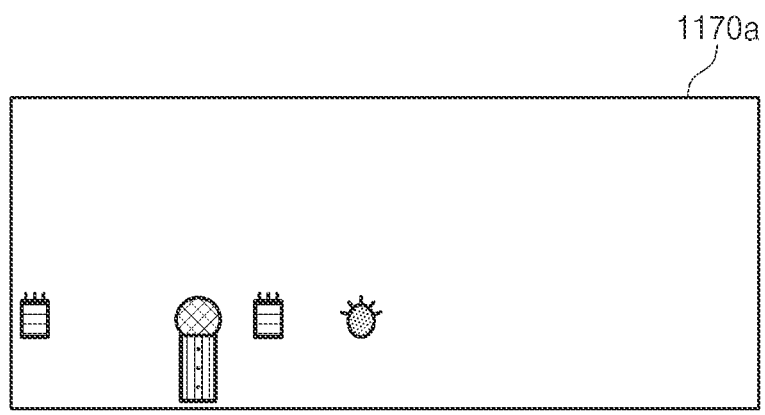
FIG. 11 is a conceptual diagram for describing a final image generated by using a color transfer method.

FIG. 11 is a conceptual diagram for describing a final image generated by using a color transfer method. For better understanding, FIGS. 9 and 11 will be referenced together.

In the case where a distance of the sensors 130 and/or 230 from the areas 1110, 1120, and/or 1130 increases as illustrated in FIG. 9 and/or in the case where a size of an occlusion area decreases as illustrated in FIG. 10, the processor 300 may generate a final image by using the color transfer method.

An image 1170a is an example of an image displayed based on a final image signal that is generated by using the color transfer method. That a color loss phenomenon and/or a pseudo color phenomenon decreases or disappears may be understood from a result of comparing the image 1170a with the image 1170 illustrated in FIG. 8.

The amount of data for luminance included in the signal s8 may be greater than the amount of data for color included in the signal s6. Accordingly, in the case of using the color transfer method, the amount of data to be processed by the processor 300 may be smaller than in the case of using the detail transfer method. Also, a speed at which the processor 300 generates an output image signal in the case of using the color transfer method may be higher than in the case of using the detail transfer method.

That is, the processor 300 may select a transfer method appropriately based on the distance d2 and/or the size of the occlusion area, thus decreasing the amount of data to be processed. Also, as the artifacts, the color loss phenomenon, and/or the pseudo color phenomenon decreases, the electronic device 1000 may display a final image having a high resolution.

Figure 12:
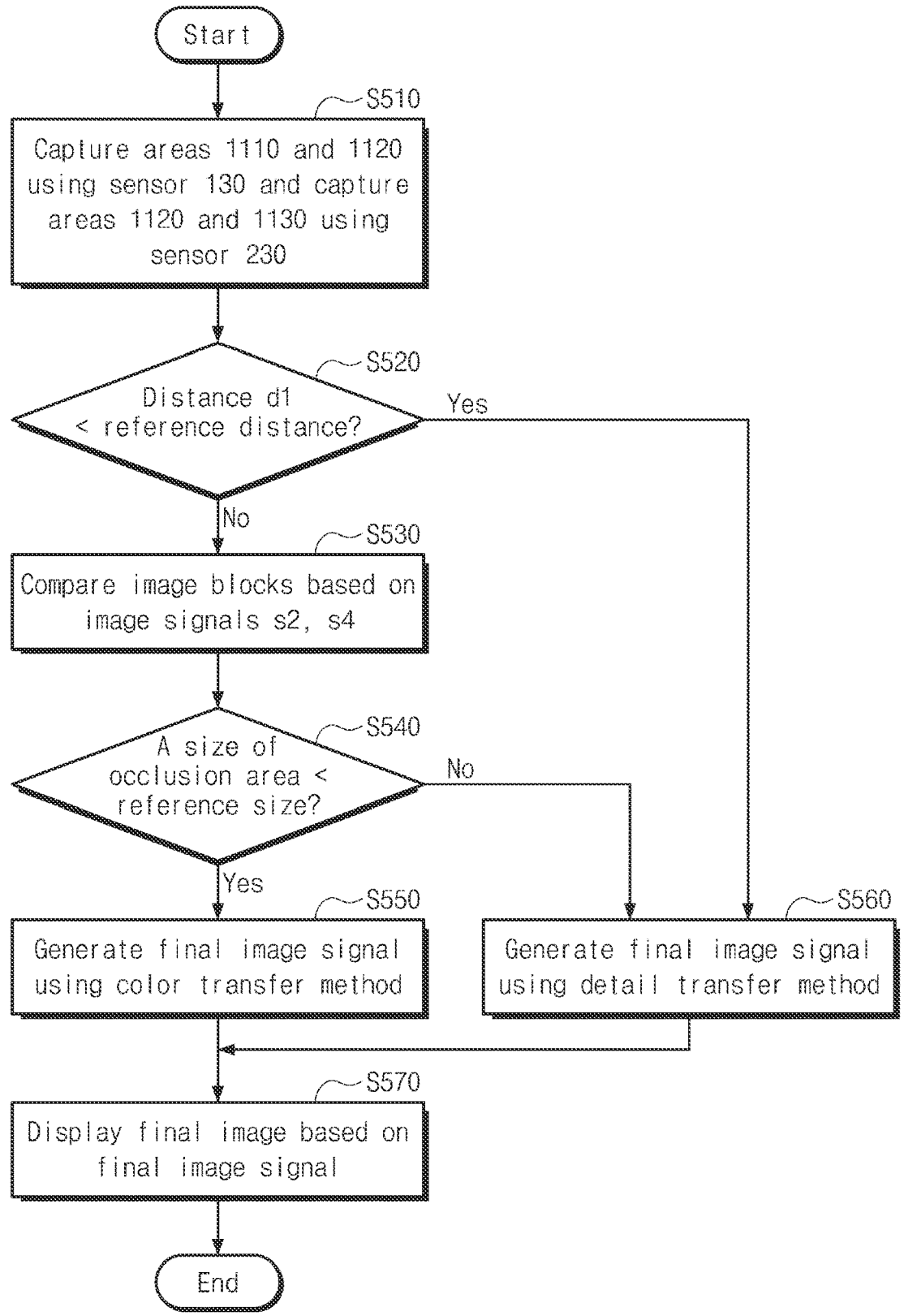
FIG. 12 is a flowchart for describing a method in which a processor selects a transfer method.

FIG. 12 is a flowchart for describing a method in which a processor selects a transfer method. For better understanding, FIGS. 1 and 12 will be referenced together.

In operation S510, the sensors 130 and 230 may capture the areas 1110, 1120, and 1130. The sensor 130 may capture the areas 1110 and 1120 at a place where the sensor 130 is located. The sensor 230 may capture the areas 1120 and 1130 at a place where the sensor 230 is located.

In operation S520, the processor 300 may compare the distance d1 from the sensors 130 and/or 230 to the areas 1110, 1120, and/or 1130 with a reference distance. The processor 300 may calculate the distance d1 and may output data for the distance d1 to the memory 330. The memory 330 may store the data of the distance d1 thus calculated. The processor 300 may use the data for the distance d1 stored in the memory 330 for comparing the distance d1 with the reference distance.

When the distance d1 is greater than or equal to the reference distance, in operation S530, the processor 300 may compare image blocks that are based on the image signals s2 and s4. The processor 300 may detect image blocks indicating an occlusion area by comparing image blocks. The processor 300 may draw (e.g., determine) a size of the occlusion area from the number of the detected image blocks and/or a size of the detected image blocks.

In operation S540, the processor 300 may compare the size of the occlusion area with a reference size.

When the size of the occlusion area is smaller than the reference size, in operation S550, the processor 300 may generate a final image signal by using the color transfer method.

When the size of the occlusion area is greater than or equal to the reference size, in operation S560, the processor 300 may generate a final image signal by using the detail transfer method.

When the distance d1 is smaller than the reference distance, in operation S560, the processor 300 may generate a final image signal by using the detail transfer method. In operation S570, the electronic device 1000 may display an image based on the final image signal.

However, some example embodiments are not limited thereto. For example, when the distance d1 is greater than or equal to the reference distance, in operation S560, the processor 300 may generate a final image signal by using the detail transfer method. Also, when the distance d1 is smaller than the reference distance, operation S530 may be performed, and then, in operation S540, the processor 300 may select the detail transfer method or the color transfer method.

In the case where operation S560 is performed after operation S520 is performed, the processor 300 may not calculate the size of the occlusion area. Accordingly, as the processor 300 performs an operation of comparing the distance d1 and the reference distance prior to an operation of comparing the size of the occlusion area and the reference size prior, the amount of data to be processed by the processor 300 may decrease.

Figure 13:
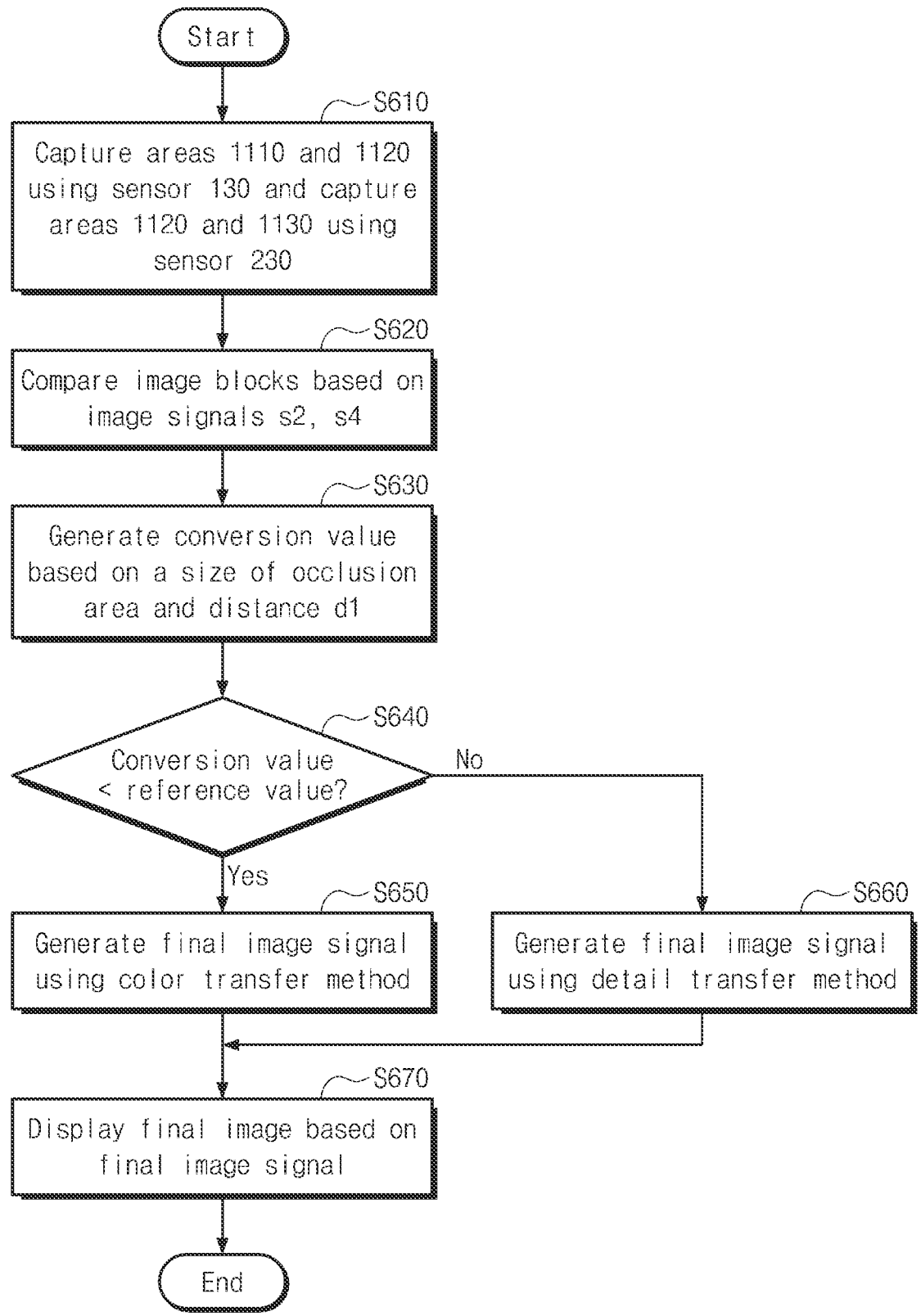
FIG. 13 is a flowchart for describing a method in which a processor selects a transfer method.

FIG. 13 is a flowchart for describing a method in which a processor selects a transfer method. For better understanding, FIGS. 1 and 13 will be referenced together.

In operation S610, the sensors 130 and/or 230 may capture the areas 1110, 1120, and/or 1130. The sensor 130 may capture the areas 1110 and 1120 at a place where the sensor 130 is located. The sensor 230 may capture the areas 1120 and 1130 at a place where the sensor 230 is located.

In operation S620, the processor 300 may compare image blocks that are based on the image signals s2 and s4. The processor 300 may detect image blocks indicating an occlusion area by comparing image blocks. The processor 300 may draw (e.g., determine) a size of the occlusion area from the number of the detected image blocks and/or a size of the detected image blocks.

In operation S630, the processor 300 may convert the size of the occlusion area thus drawn and the calculated distance d1 to generate a conversion value. The processor 300 may generate the conversion value in various methods; however, the conversion value may be generated to be proportional to the size of the occlusion area thus drawn and to be inversely proportional to the calculated distance d1, or the conversion value may be generated to be inversely proportional to the size of the occlusion area thus drawn and to be proportional to the calculated distance d1.

In operation S640, the processor 300 may compare the conversion value and a reference value.

When the conversion value is smaller than the reference value, in operation S650, the processor 300 may generate a final image signal by using the color transfer method.

When the conversion value is greater than or equal to the reference value, in operation S660, the processor 300 may generate a final image signal by using the detail transfer method. However, some example embodiments are not limited thereto. For example, when the conversion value is greater than or equal to the reference value, the processor 300 may generate a final image signal by using the color transfer method. Also, when the conversion value is smaller than the reference value, the processor 300 may generate a final image signal by using the detail transfer method.

In operation S670, the electronic device 1000 may display an image based on the final image signal.

The user may check whether a method that is used to generate the final image signal is changed, based on an image displayed in the electronic device 1000. In detail, in the case where a distance from the sensors 130 and/or 230 to the areas 1110, 1120, and/or 1130 changes from the distance d1 to the distance d2, referring to FIGS. 7 and 11, an area to be displayed in a final image may change. Also, a position of the subject 13 included in the final image may be shifted from the right to the left (or from left to right). As such, the user may check that (e.g., whether) a method that is used to generate a final image signal is changed. Also, the user may determine whether the method that is used to generate the final image signal is the color transfer method or the detail transfer method.

Figure 14:
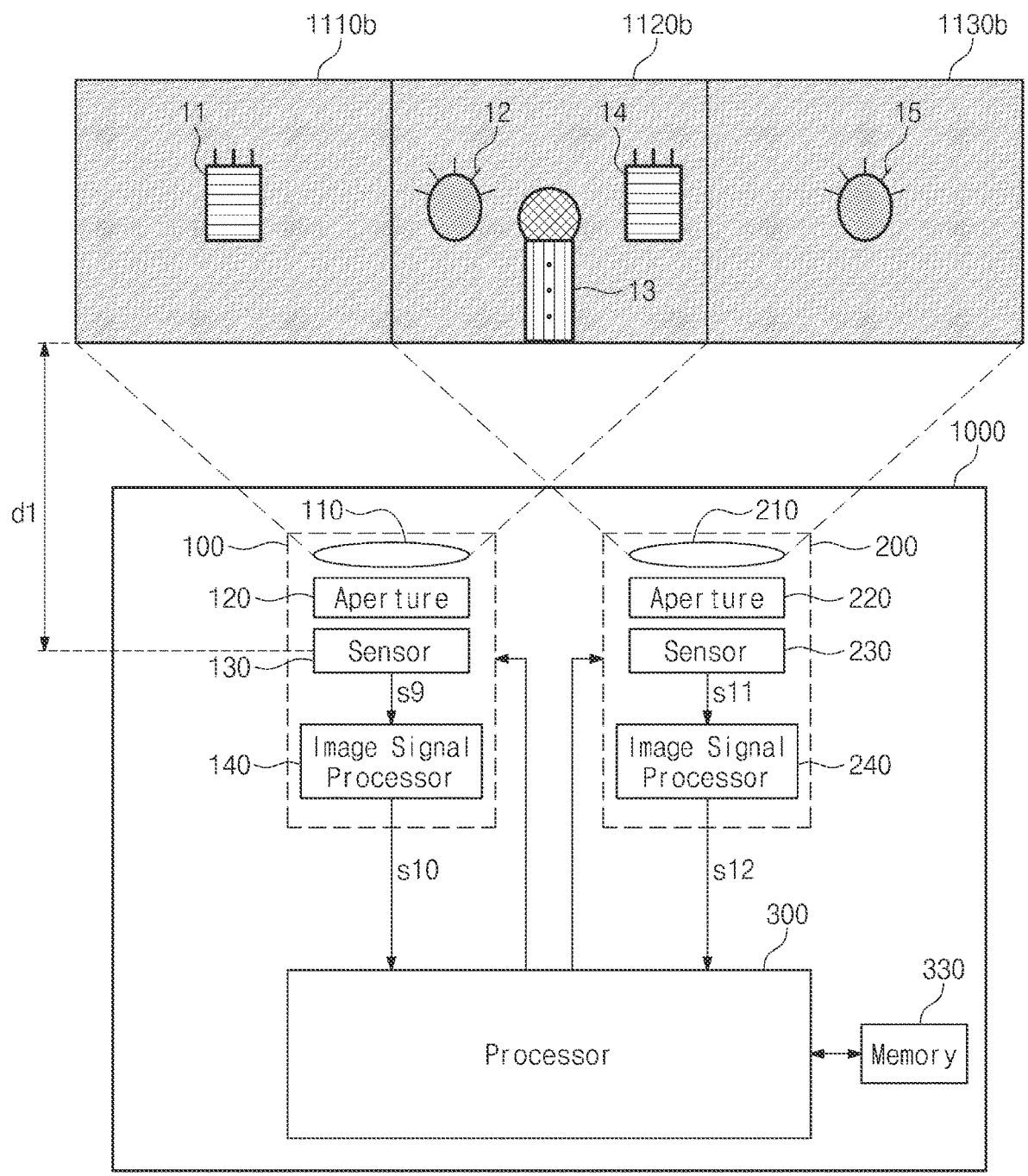
FIG. 14 is a block diagram illustrating an exemplary configuration of an electronic device including a processor according to some example embodiments.

FIG. 14 is a block diagram illustrating an exemplary configuration of an electronic device including a processor according to some example embodiments. For better understanding, FIGS. 1 and 14 will be referenced together.

FIG. 14 shows areas 1110b, 1120b, and 1130b, the illuminance of which is lower than that of the areas 1110, 1120, and 1130. FIG. 14 is associated with the case where the electronic device 1000 captures the areas 1110b, 1120b, and 1130b of low illuminance.

As described with reference to FIG. 1, the processor 300 may adjust openings of the apertures 120 and 220. The processor 300 may adjust a shutter speed. The processor 300 may control the amount of light incident to the sensors 130 and 230 by adjusting the openings of the apertures 120 and 220 and/or the shutter speed.

The sensors 130 and/or 230 may sense brightness of the areas 1110b, 1120b, and/or 1130b. The processor 300 may receive a signal associated with the sensed brightness from the image processing blocks 100 and/or 200. The processor 300 may adjust the openings of the apertures 120 and/or 220 and the shutter speed based on the sensed brightness.

In the case where the electronic device 1000 captures the areas 1110b, 1120b, and 1130b of low illuminance, brightness levels of the areas 1110b, 1120b, and/or 1130b that the processor 300 senses may be low (e.g., lower than a threshold illuminance level, also referred to herein as a performance reference level). To appropriately maintain the amount of light incident to the sensors 130 and/or 230, based on the sensed brightness, the processor 300 may make the openings of the apertures 120 and/or 220 wide and/or may make the shutter speed slow.

Nevertheless, in the case where the electronic device 1000 captures the areas 1110b, 1120b, and/or 1130b of low illuminance or very low illuminance, the amount of light incident to the sensors 130 and 230 may be relatively small. Also, a difference between the amount of light that the sensor 130 receives and the amount of light that the sensor 230 receives may be great (e.g., lower than a threshold difference level). According to some example embodiments, the threshold illuminance level and/or the threshold difference level may be design parameters determined through empirical study.

The sensors 130 and 230 may generate signals s9 and s11 based on the incident light. Magnitudes of the signals s9 and s11 may vary with the amount of incident light. The image signal processor 140 may generate signals s10 and s12 based on the signals s9 and s11. The signals s10 and s12 may include information about the magnitudes of the signals s9 and s11, respectively.

Accordingly, the processor 300 may determine that the areas 1110b, 1120b, and/or 1130b are areas of low illuminance, based on the signals s10 and/or s12. In detail, the processor 300 may determine that the areas 1110b, 1120b, and/or 1130b are areas of low illuminance, based on a difference between the amount of data for luminance included in the signal s10 and/or the amount of data for luminance included in the signal s12 (e.g., based on whether the first performance of the sensor 130 is higher or lower than the second performance of the sensor 230). Also, the processor 300 may determine that the areas 1110b, 1120b, and/or 1130b are areas of low illuminance, based on the sensed brightness. Returning to FIG. 6, the analyzing circuitry 310 may determine that the areas 1110b, 1120b, and/or 1130b are areas of low illuminance, based on the signals s10 and/or s12. The analyzing circuitry 310 may output the signal g0. The signal g0 may indicate whether the areas 1110b, 1120b, and/or 1130b are areas of low illuminance. The generating circuitry 320 may select a transfer method based on the signal g0. The generating circuitry 320 may generate a final image signal by using the selected transfer method.

Figure 15:
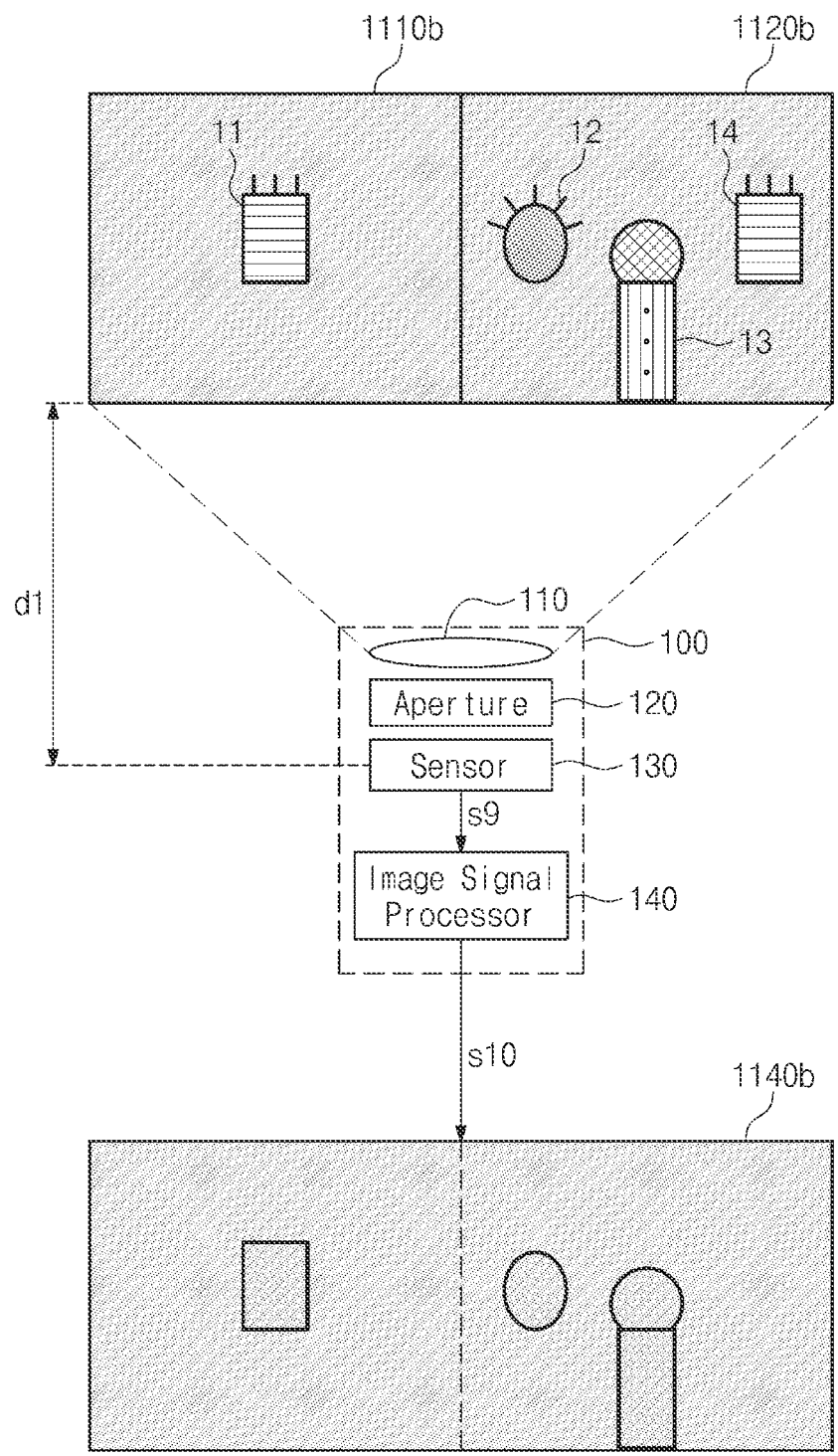
FIG. 15 is a conceptual diagram illustrating information included in an image signal output from an image processing block of FIG. 14.

FIG. 15 is a conceptual diagram illustrating information included in an image signal output from an image processing block of FIG. 14.

An image 1140b is an example of an image displayed based on the image signal s10 output from the image processing block 110. In the case where the sensor 130 captures the areas 1110b and 1120b of low illuminance, colors of the subjects 11, 12, and 13 may not be displayed in the image 1140b. In this case, to generate a final image signal, it may be more important to protect luminance data included in the image signal s12 than to protect color data included in the image signal s10.

In the case where the detail transfer method is used, in the process of mapping luminance data included in the image signal s12 onto the image signal s10, the luminance data may be lost, and/or noise may occur in the luminance data. Accordingly, in the case where the areas 1110b, 1120b, and/or 1130b are determined as an area of low illuminance, the processor 300 may generate a final image signal by using the color transfer method.

Figure 16:
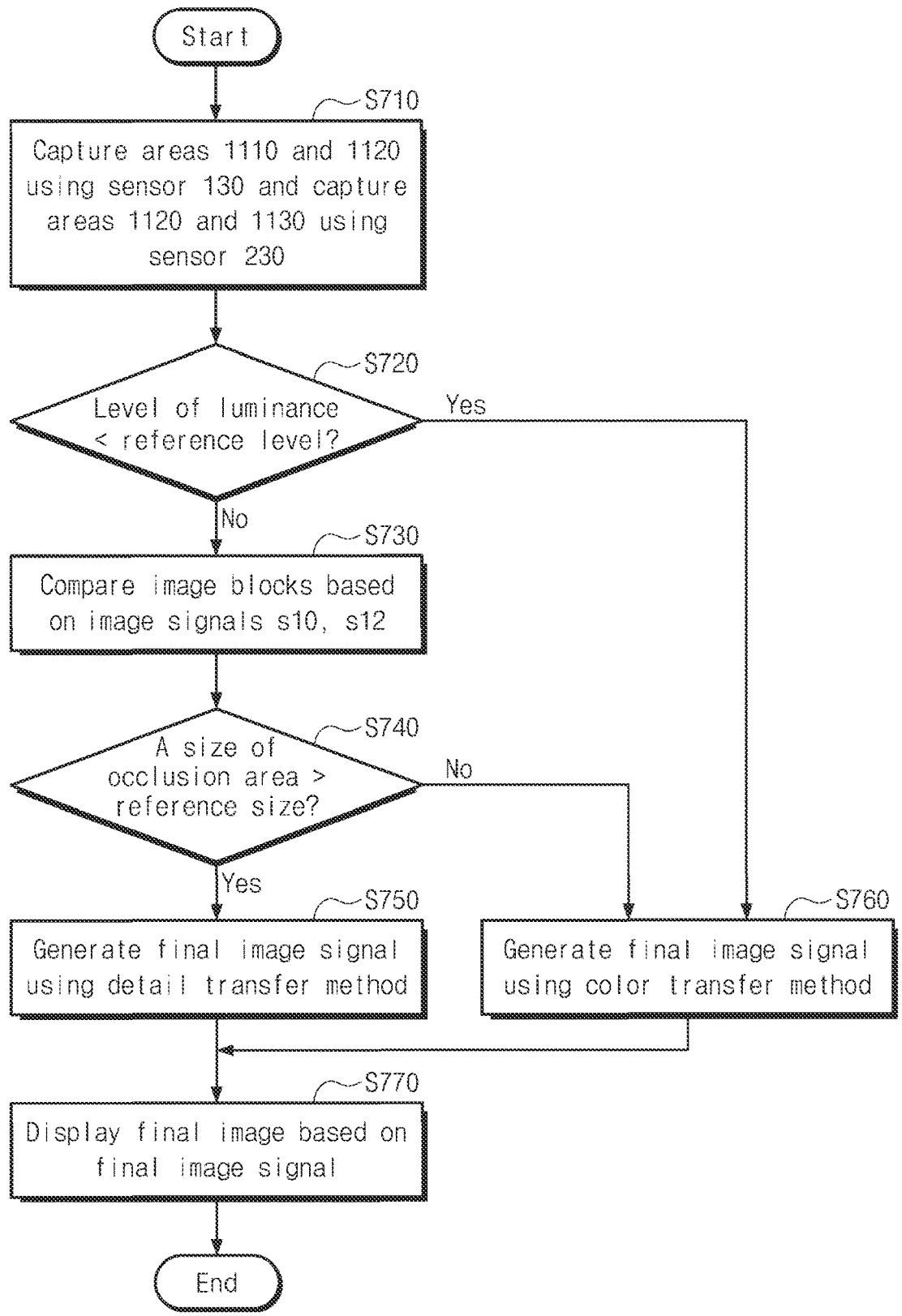
FIG. 16 is a flowchart for describing a method in which a processor selects a transfer method.

FIG. 16 is a flowchart for describing a method in which a processor selects a transfer method. For better understanding, FIGS. 14 and 16 will be referenced together.

In operation S710, the sensors 130 and/or 230 may capture the areas 1110b, 1120b, and/or 1130b. The sensor 130 may capture the areas 1110b and 1120b at a place where the sensor 130 is located. The sensor 230 may capture the areas 1120b and 1130b at a place where the sensor 230 is located.

In operation S720, the processor 300 may compare brightness levels of the areas 1110b, 1120b, and/or 1130b with a reference level (e.g., threshold illuminance level, performance reference level, etc.). As described with reference to FIGS. 1 and 14, the processor 300 may sense brightness of the areas 1110b, 1120b, and/or 1130b. The processor 300 may output data for a level of the sensed brightness to the memory 330. The memory 330 may store the data for the level of the sensed brightness. The processor 300 may use the data for the brightness level stored in the memory 330 for comparing the level of the sensed brightness with the reference level.

When the level of the sensed brightness is greater than or equal to the reference level, in operation S730, the processor 300 may compare image blocks that are based on the image signals s10 and s12. The processor 300 may detect image blocks indicating an occlusion area by comparing image blocks. The processor 300 may draw (e.g., determine) a size of the occlusion area from the number of the detected image blocks and/or a size of the detected image blocks.

In operation S740, the processor 300 may compare the size of the occlusion area with a reference size.

When the size of the occlusion area is greater than the reference size, in operation S750, the processor 300 may generate a final image signal by using the detail transfer method.

When the size of the occlusion area is smaller than or equal to the reference size, in operation S760, the processor 300 may generate a final image signal by using the color transfer method.

When the level of the sensed brightness is smaller than the reference level, in operation S760, the processor 300 may generate a final image signal by using the color transfer method.

In operation S770, the electronic device 1000 may display an image based on the final image signal. As in the method described with reference to FIG. 13, the user may check whether a method that is used to generate the final image signal is changed, based on an image displayed in the electronic device 1000.

Figure 17:
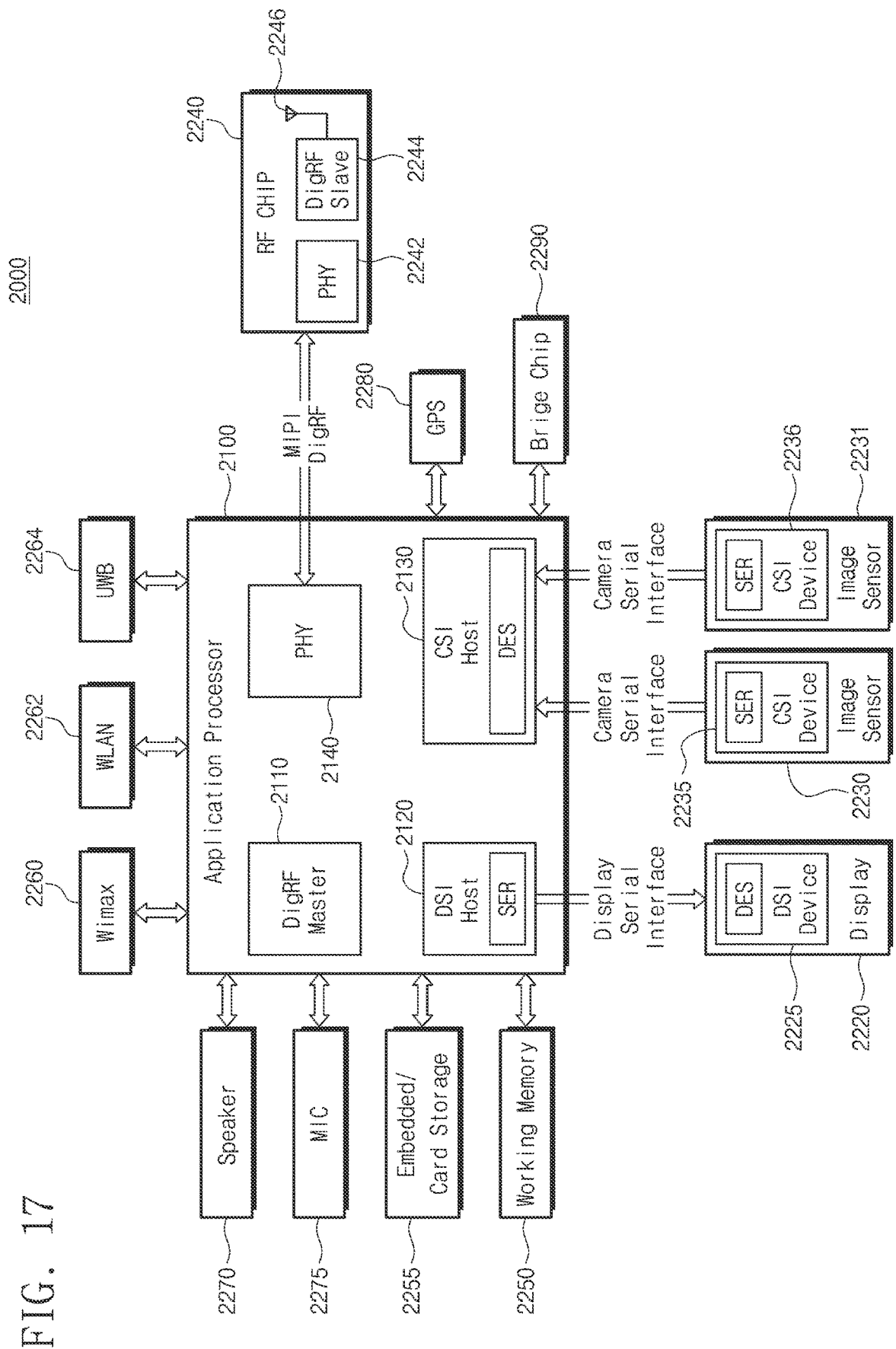
FIG. 17 is a block diagram illustrating a configuration of an electronic system including a processor and interfaces thereof, according to some example embodiments.

FIG. 17 is a block diagram illustrating a configuration of an electronic system including processing circuitry and interfaces thereof, according to some example embodiments. An electronic system 2000 may be implemented with a data processing device capable of using or supporting an interface offered by mobile industry processor interface (MIPI) alliance. For example, the electronic system 2000 may be implemented with at least one of electronic devices, such as a digital camera, a video camcorder, a smartphone, a tablet, a wearable device (e.g., a smart watch, a smart band, and/or the like), etc.

The electronic system 2000 may include processing circuitry (e.g., an application processor 2100), a display 2220, and/or an image sensors 2230 and 2231. The application processor 2100 may include a DigRF master 2110, a display serial interface (DSI) host 2120, a camera serial interface (CSI) host 2130, and/or a physical layer 2140.

The DSI host 2120 may communicate with a DSI device 2225 of the display 2220 in compliance with the DSI. For example, an optical serializer SER may be implemented in the DSI host 2120. For example, an optical deserializer DES may be implemented in the DSI device 2225.

The CSI host 2130 may communicate with CSI devices 2235 and 2236 of image sensors 2230 and 2231 through the CSI. For example, an optical deserializer may be implemented in the CSI host 2130. For example, an optical serializer SER may be implemented in the CSI devices 2235 and 2236.

For example, when the electronic system 2000 is implemented with an electronic device (e.g., a digital camera or a video camcorder) which is able to capture an image, each of the image sensors 2230 and 2231 may capture an image of an object to generate an image signal (refer to FIG. 1). The application processor 2100 may generate a final image signal based on image signals respectively output from the image sensors 2230 and 2231. The electronic system 2000 may display a final image in the display 2220 based on the final image signal.

The electronic system 2000 may further include a radio frequency (RF) chip 2240 that communicates with the application processor 2100. The RF chip 2240 may include a physical layer 2242, a DigRF slave 2244, and/or an antenna 2246. For example, the physical layer 2242 of the RF chip 2240 and the physical layer 2140 of the application processor 2100 may exchange data with each other through a DigRF interface supported by the MIPI alliance.

The electronic system 2000 may further include a working memory 2250 and/or embedded/card storage 2255. The working memory 2250 and/or the embedded/card storage 2255 may store data received from the application processor 2100.

The working memory 2250 may temporarily store data processed and/or to be processed by the application processor 2100. The working memory 2250 may include a volatile memory such as an SRAM, a DRAM, and/or an SDRAM, and/or a nonvolatile memory such as a flash memory, a PRAM, an MRAM, a ReRAM, and/or a FRAM.

The embedded/card storage 2255 may store data regardless of whether a power is supplied. The embedded/card storage 2255 may include one or more nonvolatile memories, a memory controller, and/or a buffer.

The electronic system 2000 may communicate with an external system through a communication module, such as a worldwide interoperability for microwave access (WiMAX) 2260, a wireless local area network (WLAN) 2262, and/or an ultra-wideband (UWB) 2264, and/or the like. Even though the WiMAX 2260, the WLAN 2262 and the UWB 2264 are mentioned, the electronic system 2000 may further include various communication modules.

The electronic system 2000 may further include a speaker 2270 and/or a microphone 2275 for processing voice information. The electronic system 2000 may further include a global positioning system (GPS) device 2280 for processing position information. The electronic system 2000 may further include a bridge chip 2290 for managing connections between peripheral devices.

A processor of some example embodiments may select a color transfer method and/or a detail transfer method in consideration of an occlusion area, an illuminance environment, and/or a distance between a subject and an electronic device.

According to some example embodiments, as a transfer method is appropriately selected, the amount of data to be processed by the processor may decrease, and/or the quality of final image may be improved.

While some example embodiments have been described with reference to examples thereof, it will be apparent to those of ordinary skill in the art that various changes and modifications may be made thereto without departing from the spirit and scope of some example embodiments as set forth in the following claims.

What is claimed is:

1. An electronic device, comprising:
   a first image processing block including a first image sensor, the first image sensor configured to:
      capture a target area, and
      generate first image data including color information of the target area;
   a second image processing block including a second image sensor and a depth sensor, the second image sensor configured to:
      capture the target area, and
      generate second image data, and
   the depth sensor configured to generate distance information;
   a first lens adjacent to the first image sensor;
   a second lens adjacent to the second image sensor; and
   a processor configured to:
      adjust a first position of the first lens and the first image sensor based on the distance information, the distance information corresponding to a distance between the target area and a position from which the target area is captured,
      adjust a second position of the second lens and the second image sensor based on the distance information,
      adjust a focus based on the distance information, and
      generate final image data based the first image data and the second image data, the first image data and the second image data being generated after the adjustment of the focus.

2. The electronic device of claim 1, wherein the processor is further configured to adjust the focus based on at least one of the adjusted first position or the adjusted second position.

3. The electronic device of claim 1, wherein the second image processing block includes at least one of a photo diode, an infrared light receiving element, a charge coupled device, or a piezoelectric element.

4. The electronic device of claim 1, wherein the processor is further configured to generate the distance information by using a triangulation manner or an ultrasonic manner.

5. The electronic device of claim 1, wherein the second image data includes luminance information of the target area.

6. The electronic device of claim 5, further comprising:
   a first aperture adjacent to the first image sensor; and
   a second aperture adjacent to the second image sensor,
   wherein the processor is further configured to:
      adjust a first opening of the first aperture or a first shutter speed corresponding to the first image sensor based on the luminance information, and
      adjust a second opening of the second aperture or a second shutter speed corresponding to the second image sensor based on the luminance information.

7. The electronic device of claim 5, wherein the processor is further configured to:
   generate a first analysis result based on the distance information; and
   select a color transfer manner or a detail transfer manner based on the first analysis result,
   wherein the processor is further configured to:
      generate the final image data based on the color information and the second image data by using the color transfer manner, or
      generate the final image data based on the luminance information and the first image data by using the detail transfer manner.

8. The electronic device of claim 5, wherein the processor is further configured to:
   generate a second analysis result based on a level of brightness of the target area; and
   select a color transfer manner or a detail transfer manner based on the second analysis result,
   wherein the processor is further configured to:
      generate the final image data based on the color information and the second image data by using the color transfer manner, or
      generate the final image data based on the luminance information and the first image data by using the detail transfer manner.

9. The electronic device of claim 5, wherein the processor is further configured to:
   generate a third analysis result based on a size of a partial area of the target area, the partial area being captured by one of the first image sensor and the second image sensor; and
   select a color transfer manner or a detail transfer manner based on the third analysis result, wherein the processor is further configured to:
generate the final image data based on the color information and the second image data by using the color transfer manner, or
generate the final image data based on the luminance information and the first image data by using the detail transfer manner.

10. An electronic device, comprising:
a first image processing block configured to:
capture a target area, and
generate first image data including color information of the target area;
a second image processing block configured to:
capture the target area, and
generate second image data;
a first lens adjacent to a first image sensor of the first image processing block;
a second lens adjacent to a second image sensor of the second image processing block; and
a processor configured to:
adjust a first position of the first lens and the first image sensor based on distance information, the distance information corresponding to a distance between the target area and a position from which the target area is captured,
adjust a second position of the second lens and the second image sensor based on the distance information,
adjust a focus based on the distance information, and
generate final image data based on the first image data and the second image data, the first image data and the second image data being generated after the adjustment of the focus.

11. The electronic device of claim 10, wherein
the first image processing block includes:
the first lens,
a first aperture adjacent to the first lens,
a first sensor adjacent to the first aperture, the first sensor being configured to generate a first image signal by capturing the target area, and
a first image signal processor configured to generate the first image data based on the first image signal; and
the second image processing block includes:
the second lens, the second lens being spaced from the first lens,
a second aperture adjacent to the second lens,
a second sensor adjacent to the second aperture, the second sensor being configured to generate a second image signal by capturing the target area, and
a second image signal processor configured to generate the second image data based on the second image signal.

12. A method of operating an electronic device which includes a first image processing block, a second image processing block, a first lens, a second lens, and a processor, the first image processing block including a first image sensor, the second image processing block including a second image sensor and a depth sensor, the first lens being adjacent to the first image sensor, the second lens being adjacent to the second image sensor, the depth sensor configured to generate distance information, and the method comprising:
adjusting, by the processor, a first position of the first lens and the first image sensor based on the distance information, the distance information corresponding to a distance between a target area and a position from which the target area is captured;
adjusting, by the processor, a second position of the second lens and the second image sensor based on the distance information;
adjusting, by the processor, a focus based on the distance information;
generating, by the first image sensor, first image data including color information of the target area after the adjusting the focus;
generating, by the second image sensor, second image data after the adjusting the focus; and
generating, by the processor, final image data based on the first image data and the second image data.

13. The method of claim 12, wherein
the adjusting the focus includes
adjusting, by the processor, the focus based on at least one of the adjusted first position or the adjusted second position.

14. The method of claim 12, wherein the second image processing block further includes at least one of a photo diode, an infrared light receiving element, a charge coupled device, or a piezoelectric element.

15. The method of claim 12, further comprising:
generating, by the processor, the distance information by using a triangulation manner or an ultrasonic manner.

16. The method of claim 12, wherein the second image data includes luminance information of the target area.

17. The method of claim 16, further comprising:
generating, by the processor, a first analysis result based on the distance information; and
selecting, by the processor, a color transfer manner or a detail transfer manner based on the first analysis result,
wherein the generating, by the processor, the final image data includes:
generating, by the processor, the final image data based on the color information and the second image data by using the color transfer manner, or
generating, by the processor, the final image data based on the luminance information and the first image data by using the detail transfer manner.

18. The method of claim 16, further comprising:
generating, by the processor, a second analysis result based on a level of brightness of the target area; and
selecting, by the processor, a color transfer manner or a detail transfer manner based on the second analysis result,
wherein the generating, by the processor, the final image data includes:
generating, by the processor, the final image data based on the color information and the second image data by using the color transfer manner or
generating, by the processor, the final image data based on the luminance information and the first image data by using the detail transfer manner.

19. The method of claim 16, further comprising:
generating, by the processor, a third analysis result based on a size of a partial area of the target area, the partial area being captured by one of the first image sensor or the second image sensor; and
selecting, by the processor, a color transfer manner or a detail transfer manner based on the third analysis result
wherein the generating, by the processor, the final image data includes:
generating, by the processor, the final image data based on the color information and the second image data by using the color transfer manner, or generating, by the processor, the final image data based on the luminance information and the first image data by using the detail transfer manner.

\* \* \* \* \*